United States Patent [19]
Takamura et al.

[11] Patent Number: 5,970,897
[45] Date of Patent: Oct. 26, 1999

[54] METHOD AND APPARATUS FOR SEWING PANTY HOSE WITH BACKPANEL-LIKE GUSSET INSERTED

[75] Inventors: Toyonori Takamura; Masataka Tsuchiya; Takanori Imai, all of Nara-ken; Toshiharu Ueda, Yamatotakada, all of Japan

[73] Assignee: Takatori Corporation, Japan

[21] Appl. No.: 09/072,066

[22] Filed: May 4, 1998

[30] Foreign Application Priority Data

May 12, 1997 [JP] Japan ................................ 9-137534

[51] Int. Cl.⁶ .................................................. D05B 21/00
[52] U.S. Cl. ................................. 112/475.12; 112/470.15
[58] Field of Search ........................ 112/475.12, 470.15, 112/470.08, 470.16; 223/75, 77

[56] References Cited

U.S. PATENT DOCUMENTS

| | | | |
|---|---|---|---|
| 4,101,982 | 7/1978 | Muller ........................................ 2/409 |
| 4,188,897 | 2/1980 | Takatori . | |
| 4,188,898 | 2/1980 | Bell, Jr. et al. ..................... 112/470.15 |
| 4,524,705 | 6/1985 | Humphreys ........................ 112/470.15 |
| 5,058,516 | 10/1991 | Maegawa et al. ............. 112/470.15 X |
| 5,207,166 | 5/1993 | Eichhorn ............................ 112/475.12 |

FOREIGN PATENT DOCUMENTS 2012326  7/1979  United Kingdom .

*Primary Examiner*—Ismael Izaguirre
*Attorney, Agent, or Firm*—Alston & Bird LLP

[57] ABSTRACT

A method for sewing panty hose with a backpanel-like gusset inserted includes steps of cutting inner thigh portion of left-and-right aligned cylindrical hose materials and thereafter inserting the backpanel-like gusset material to a position ranging from rear portion to inner thigh portion of the panty part. The backpanel-like gusset material is folded into two and inserted into between the upper middle clamp and the lower middle clamp of a pair of left and right clamp groups. After the cutting of the gusset material, upper edge portion and lower edge portion of the gusset material inserted between the upper and lower middle clamps are sewn individually to cut edges of the hose materials.

16 Claims, 25 Drawing Sheets

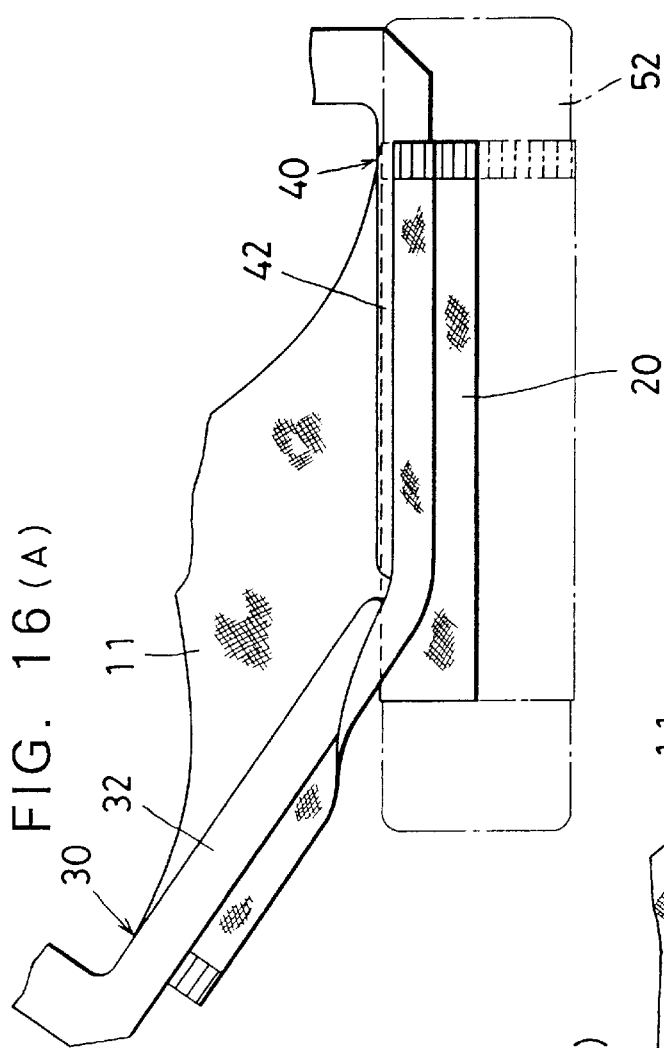
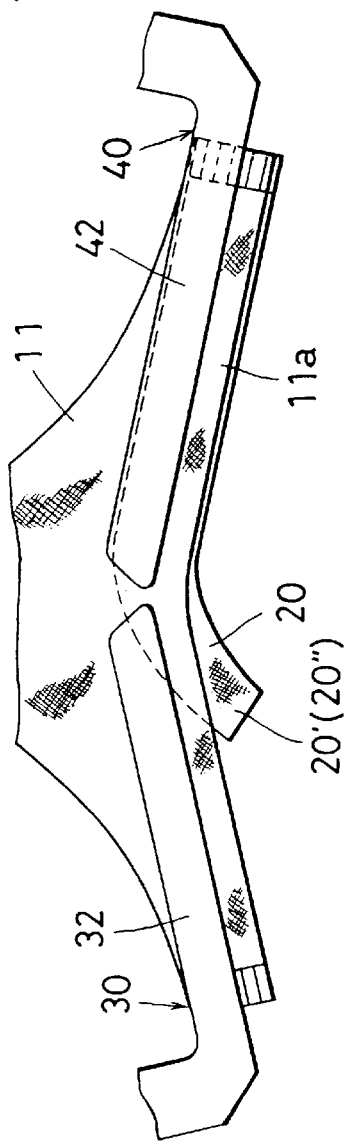
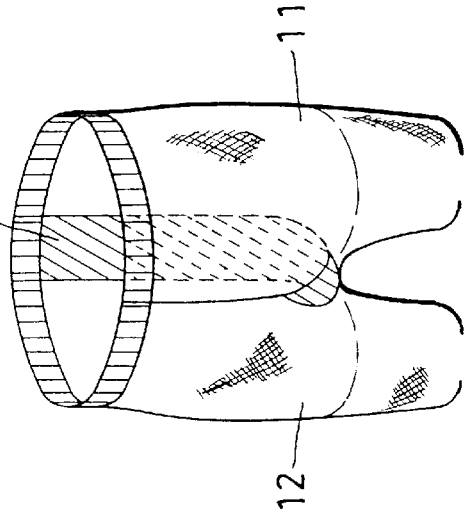
FIG. 16(A)
FIG. 16(B)
FIG. 16(C)

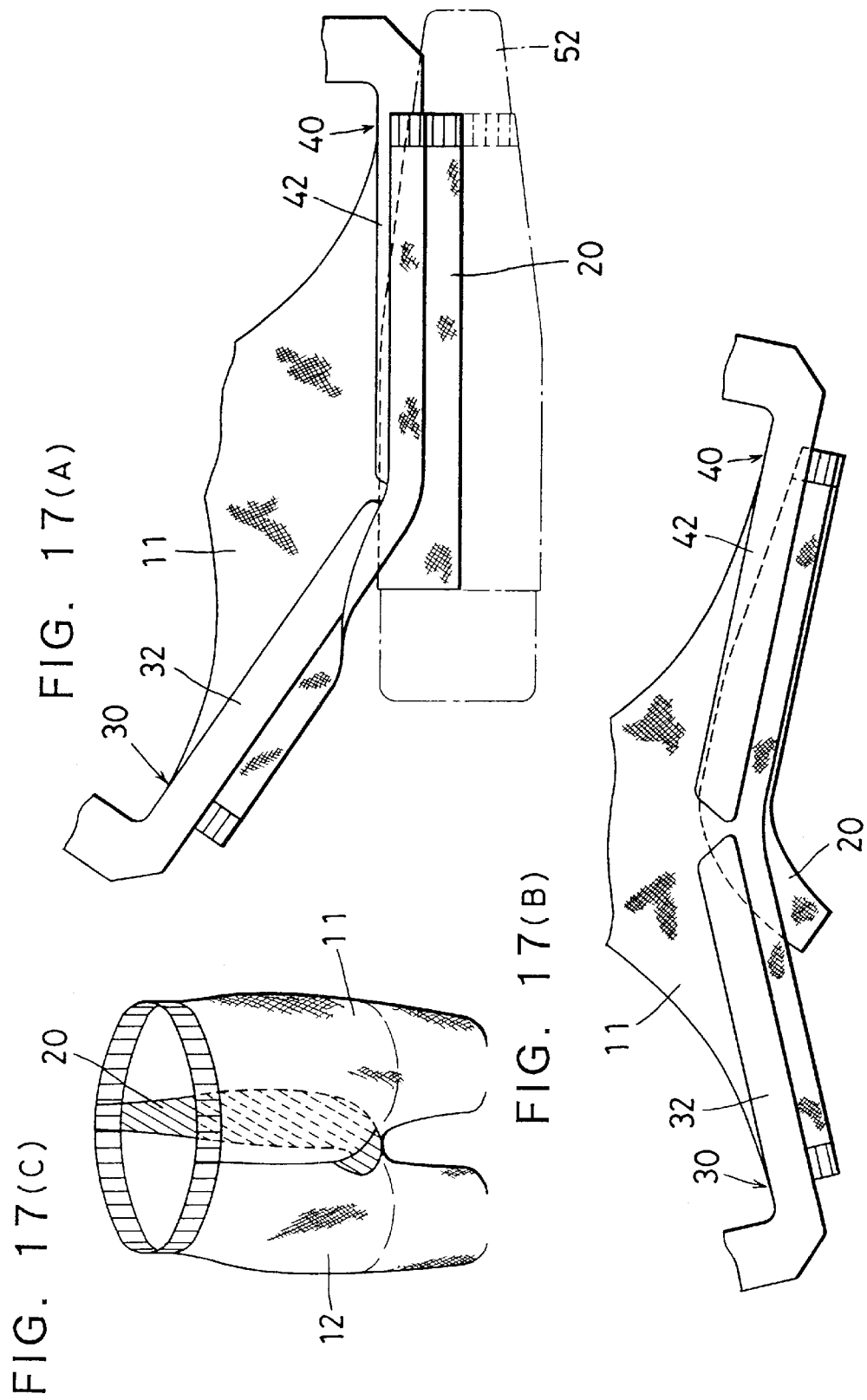

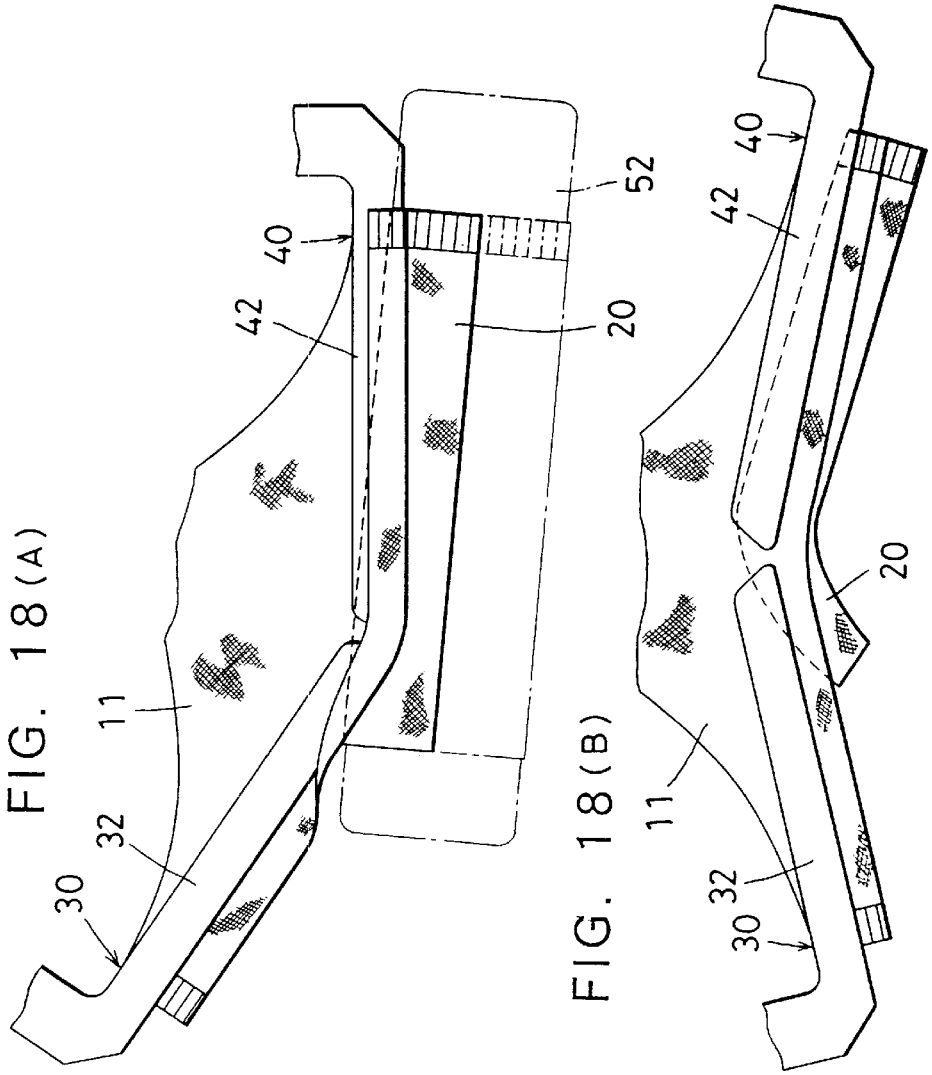

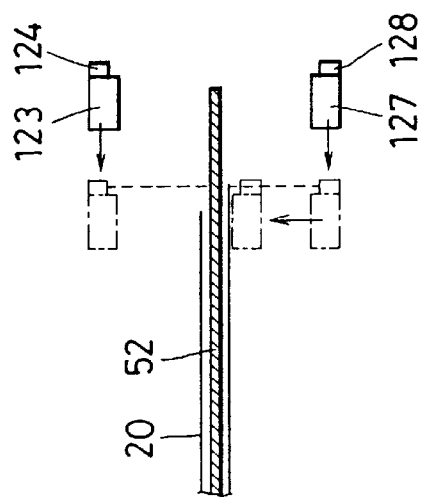
FIG. 20(A)
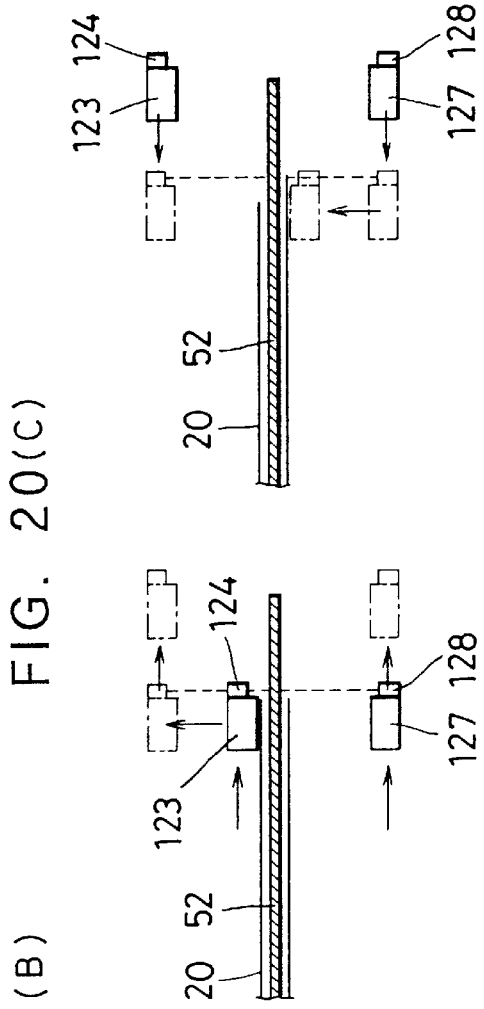
FIG. 20(B)
FIG. 20(C)
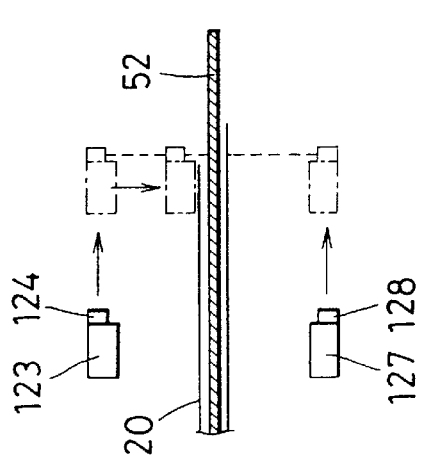
FIG. 20(D)
FIG. 20(E)
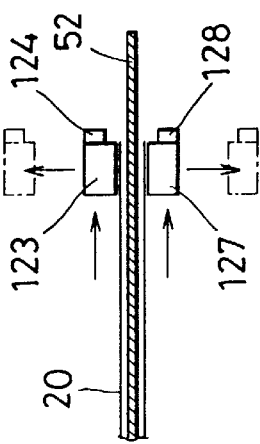
FIG. 20(F)

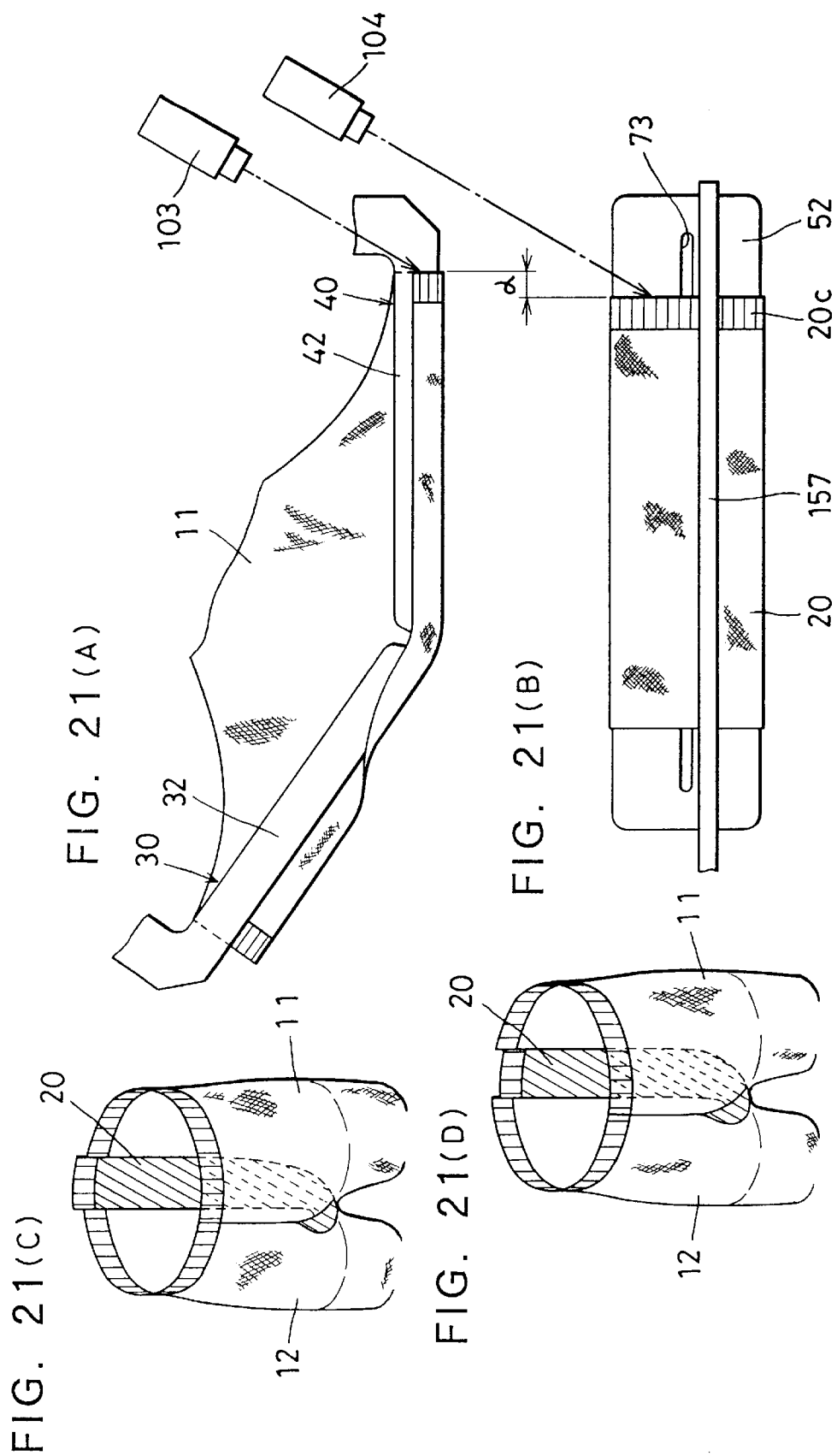

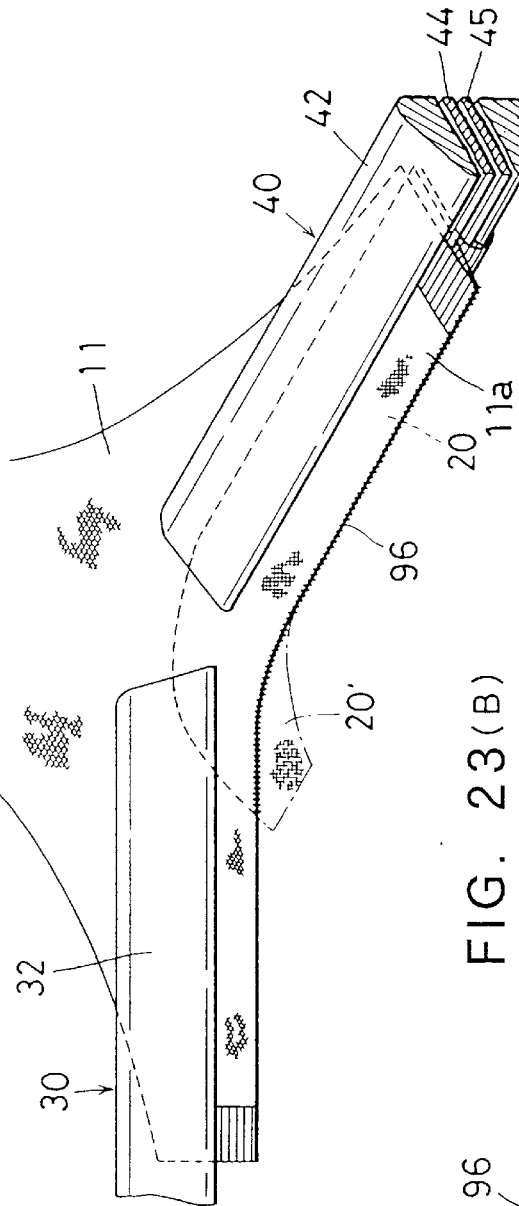
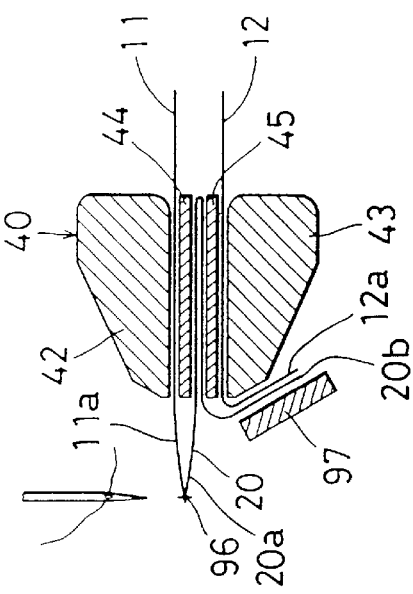
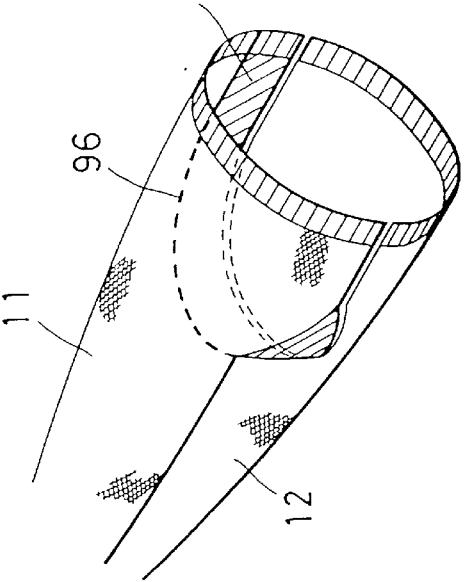
FIG. 23(A)
FIG. 23(B)
FIG. 23(C)

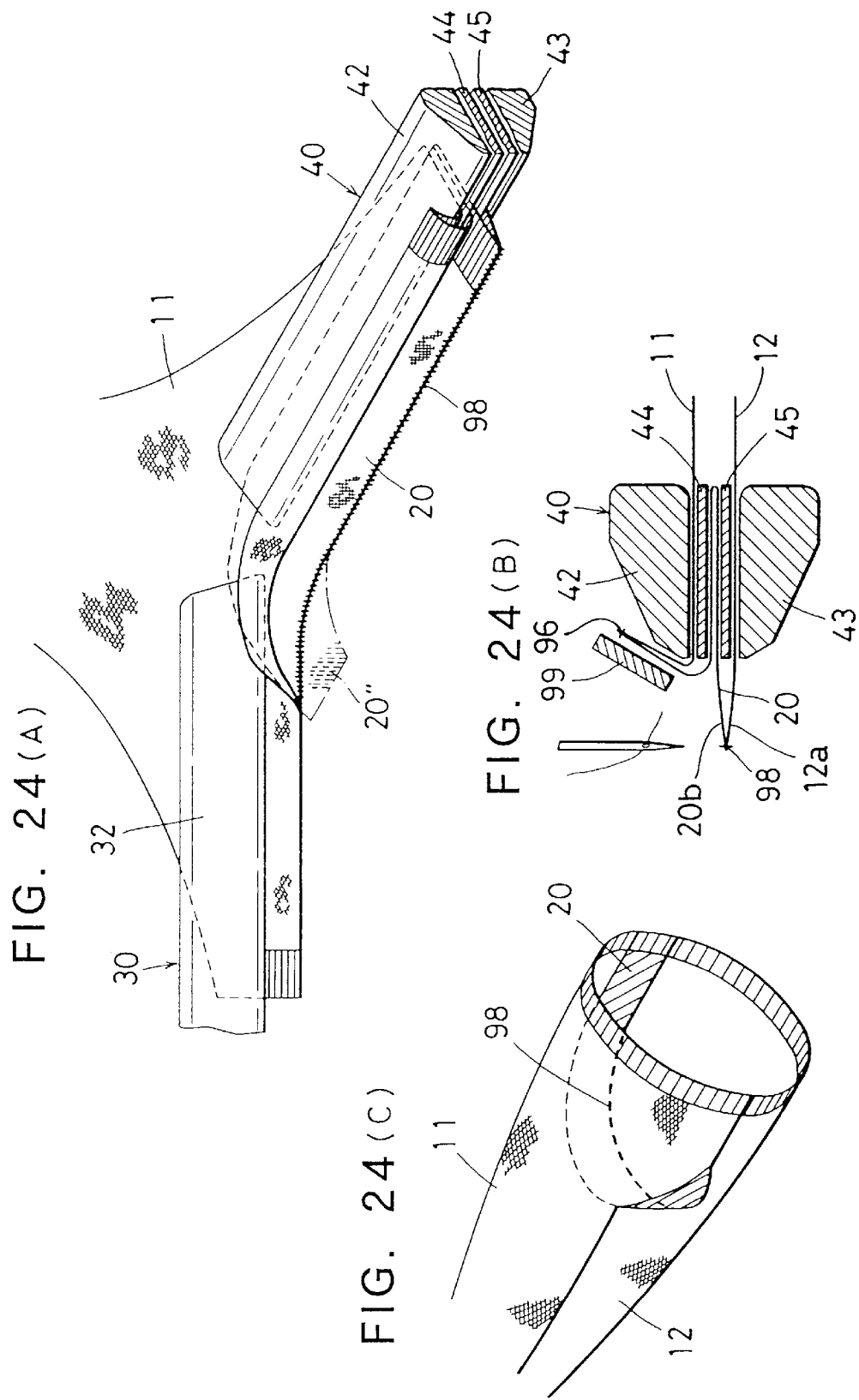

//3,970,897

METHOD AND APPARATUS FOR SEWING PANTY HOSE WITH BACKPANEL-LIKE GUSSET INSERTED

BACKGROUND OF THE INVENTION

The present invention relates to method and apparatus for sewing panty hose with a backpanel-like gusset inserted from rear portion to inner thigh portion of the panty part.

As this type of panty hose sewing method, conventionally, there has been known a method in which after inner thigh portions of left-and-right cylindrical stocking material pieces are cut out, a diamond-shaped gusset material for forming a gusset portion at the inner thigh portion site is folded in two, i.e. into a triangular shape and then inserted into the cut-out inner thigh portions of the left-and-right cylindrical material pieces, where the gusset material is sewn, so that a pair of panty hose with a diamond-shaped gusset inserted into the inner thigh portions of the left-and-right paired cylindrical material pieces are fabricated (see, for example, Japanese Patent Publication SHO 57-17961).

An outline of this sewing process for panty hose with a diamond-shaped gusset inserted is described with reference to FIGS. 25 and 26.

Referring first to FIG. 25(A), reference numerals 1 and 2 denote left-leg and right-leg hose pieces, respectively, knitted by an ordinary circular knitting machine. After these two left and right hose pieces are aligned left and right, they are bitten by each other along lines 3, 4 as shown in FIG. 25(B), where a middle portion defined between the bite lines 3 and 4 is cut out along a broken line 5 so that an inner thigh portion is cut open as shown in FIG. 25(C). Then, a diamond-shaped gusset material 8 is inserted in central portion of the crotch portion. After that, first a seam 6 as shown in FIG. 26(A) and then a seam 7 as shown in FIG. 26(B) are formed in parallel with the bite lines 3, 4 by two-step process with a sewing machine. Thus, a pair of panty hose 10 with the diamond-shaped gusset 8 inserted at inner thigh portion as shown in FIG. 26(C) is obtained.

The conventional panty hose with a diamond-like gusset inserted indeed can afford a wearing fitness at an inner thigh portion 9a of a panty part 9, but would be uncomfortable to wear because a front portion 9b and a rear portion 9c of the panty part 9 are of exactly the same size, which causes the wearer's hip portion to be strongly tensed. In particular, recent years' wearers are constricted at the waist portion and projected at the hip portion in their bodily shape. Due to this, the stretch in the rear portion 9c is increased, which has become a cause of deterioration in the wearing fitness.

SUMMARY OF THE INVENTION

The present invention has been accomplished in view of these and other problems. An object of the invention is therefore to provide method and apparatus for sewing panty hose with a backpanel-like gusset inserted which method and apparatus are capable of improving the wearing fitness over a range from rear portion to inner thigh portion of the panty part, and which are suited for automatization of sewing process.

Another object of the invention is to provide method and apparatus for sewing panty hose with such a so-called kite-shaped gusset inserted which panty hose is constricted at the waist portion and has increasingly larger width in the hip portion.

To achieve the above objects, the invention in a first aspect provides a method for sewing panty hose with a backpanel-like gusset inserted over a range from rear portion to inner thigh portion of panty part, comprising in sequence: a material inserting step for inserting a pair of cylindrical hose material pieces to each of a left-and-right pair of upper clamps and a left-and-right pair of lower clamps; a cutting process for, with a left-and-right pair of upper middle clamps and a left-and-right pair of lower middle clamps placed between their corresponding pairs of upper clamps and lower clamps, pressing and holding each pair of hose material pieces from above and below by their corresponding upper clamp and lower clamp and simultaneously biting inner opposing portions of the upper and lower hose material pieces by the upper clamp and the upper middle clamp and by the lower clamp and the lower middle clamp, respectively, and cutting the inner opposing portions of the hose material pieces over a range from central opening portion to the inner thigh portion; a material separating process for expanding the clamp groups outward from a parallel state while cut edges of the cut hose material pieces are kept bitten, thereby making the cut edges exposed, and moreover separating the exposed cut edges above and below; a gusset material inserting and holding step for inserting a lengthwise-two-folded backpanel-like gusset material into between the above and below separated cut edges, and thereafter making the gusset material bitten between the upper middle clamp and the lower middle clamp; and a sewing step for, by sewing machine process, sewing one edge portion of the backpanel-like gusset material to one cut edge of the hose material pieces, thereafter sewing the other edge portion of the gusset material to the other cut edge of the hose material pieces, and moreover sewing the remaining cut edge of the hose material pieces, wherein the gusset material is sewn so as to be smaller in width in welt portion and increasingly larger in width toward hip portion.

The invention in a second aspect provides a method for sewing panty hose with a backpanel-like gusset inserted as described in the first aspect, wherein a gusset material insertion plate is used in the gusset material inserting and holding step, and the insertion plate is formed into a tapered shape so that the gusset material is sewn so as to be smaller in width at the welt portion and increasingly larger in width toward the hip portion.

The invention in a third aspect provides a method for sewing panty hose with a backpanel-like gusset inserted as described in the first aspect, wherein a gusset material insertion plate is used in the gusset material inserting and holding step, and the insertion plate is formed into a straight shape with both sides parallel to each other and, when the gusset material is inserted into the clamps, the insertion plate is set in a tilted position, so that the gusset material is sewn so as to be smaller in width at the welt portion and increasingly larger in width toward the hip portion.

The invention in a fourth aspect provides a method for sewing panty hose with a backpanel-like gusset inserted as described in the first aspect, wherein a gusset material insertion plate is used in the gusset material inserting and holding step, and the insertion plate is formed into a tapered shape and, when the gusset material is inserted into the clamps, the insertion plate is set in a tilted position, so that the gusset material is sewn so as to be smaller in width at the welt portion and increasingly larger in width toward the hip portion.

The invention in a fifth aspect provides a method for sewing panty hose with a backpanel-like gusset inserted over a range from rear portion to inner thigh portion of panty part, comprising in sequence: a material inserting step for inserting a pair of cylindrical hose material pieces to each of a left-and-right pair of upper clamps and a left-and-right pair of lower clamps; a cutting process for, with a left-and-right pair of upper middle clamps and a left-and-right pair of lower middle clamps placed between their corresponding pairs of upper clamps and lower clamps, pressing and holding each pair of hose material pieces from above and below by their corresponding upper clamp and lower clamp and simultaneously biting inner opposing portions of the upper and lower hose material pieces by the upper clamp and the upper middle clamp and by the lower clamp and the lower middle clamp, respectively, and cutting the inner opposing portions of the hose material pieces over a range from central opening portion to the inner thigh portion; a material separating process for expanding the clamp groups outward from a parallel state while cut edges of the cut hose material pieces are kept bitten, thereby making the cut edges exposed, and moreover separating the exposed cut edges above and below; a gusset material inserting and holding step for inserting a lengthwise-two-folded backpanel-like gusset material into between the above and below separated cut edges, and thereafter making the gusset material bitten between the upper middle clamp and the lower middle clamp; and a sewing step for, by sewing machine process, sewing one edge portion of the backpanel-like gusset material to one cut edge of the hose material pieces, thereafter sewing the other edge portion of the gusset material to the other cut edge of the hose material pieces, and moreover sewing the remaining cut edge of the hose material pieces, wherein a position of one welt end portion of the cut edges of the hose material pieces bitten by the clamps and a position of a welt end portion of the gusset material before the insertion into between the clamps in the gusset material inserting and holding step are each detected, and based on this detection, a positioning process is performed so that the two welt end portions are aligned in line with each other and then the gusset material is inserted into between the clamps.

The invention in a sixth aspect provides a method for sewing panty hose with a backpanel-like gusset inserted as described in any one of the first to fifth aspects, wherein a gusset material insertion plate is used in the gusset material inserting and holding step, and the gusset material inserted in the insertion plate is cut lengthwise into two divisions so that the gusset material is used two times.

The invention in a seventh aspect provides an apparatus for sewing panty hose with a backpanel-like gusset inserted, in which on a line on which a clamp mechanism with cylindrical hose material pieces loaded above and below moves intermittently, there are set a material loading position where a pair of hose material pieces are loaded to the clamp mechanism, a cut position where the hose material pieces bitten by the clamp mechanism from above and below are cut at central opening portion to crotch portion of the hose material pieces, a material expanding position where cut edges of the cut hose material pieces are expanded open so as to be exposed while they are kept bitten, and where the cut edges are separated from each other above and below, a gusset material inserting position where a backpanel-like gusset material folded into two is inserted into between the above and below separated cut edges of the hose material pieces and bitten, and a sewing position where edge portion of the gusset material, the cut edges of the hose material pieces and the remaining cut edge of the hose material pieces are sewn together, the clamp mechanism comprising a left and right pair of upper clamps which are expandable from a parallel state and a left and right pair of lower clamps which are expandable from a parallel state, the upper clamps and the lower clamps being placed above and below opposite to each other so that they can be moved to approach to and separate from each other, the clamp mechanism further comprising, between the upper clamps and the lower clamps, a left and right pair of upper middle clamps which are expandable from a parallel state and contactable with and separable from the upper clamps, and similarly a left and right pair of lower middle clamps which are expandable from a parallel state and contactable with and separable from the lower clamps, the apparatus being characterized in that a gusset material feed mechanism is provided at a position corresponding to the gusset material inserting position, the feed mechanism comprising in combination a welt-end-portion positioning mechanism for holding horizontal and feeding forward a gusset material insertion plate with the gusset material inserted therein, and an inverting and holding mechanism for receiving the gusset material insertion plate from the welt-end-portion positioning mechanism and feeding the gusset material into between the clamps, the welt-end-portion positioning mechanism having a function of aligning, in line above and below, a welt end portion of the gusset material inserted into the gusset material insertion plate, the inverting and holding mechanism comprising cutting means for cutting lengthwise the gusset material inserted into the gusset material insertion plate and inverting means for inverting the held gusset material insertion plate.

The invention in an eighth aspect provides an apparatus for sewing panty hose with a backpanel-like gusset inserted as described in the seventh aspect, further comprising: first detecting means for detecting one welt end portion of the cut edges of the hose material pieces bitten by the clamp mechanism that is stopped at the gusset material inserting position; and second detecting means for detecting the welt end portion of the gusset material inserted into the gusset material insertion plate held horizontally by the inverting and holding mechanism, wherein the gusset material insertion plate is moved by the inverting and holding mechanism based on conditions detected by the two detecting means so that the welt end portions of the hose material pieces and the welt end portion of the gusset material are aligned in line with each other.

According to the present invention, since the backpanel like gusset is inserted over a range from rear portion to inner thigh portion of the panty part, the panty part becomes wider in rear portion than in front portion. Therefore, the wearer's hip portion is no longer strongly tensed, so that a better wearing fitness results. Further, since the backpanel-like gusset can be inserted in the hose material by automatic sewing process, panty hose manufacturers are enabled to implement high efficiency sewing work.

BRIEF DESCRIPTION OF THE DRAWINGS

FIG. 1 shows explanatory views of the sewing process of panty hose with a backpanel-like gusset according to the present invention, where

FIG. 16(A) is a plan view showing a state in which the gusset material is fed to the clamp mechanism, FIG. 16(B) is a plan view in which the gusset material insertion plate has been withdrawn from the state of FIG. 16(A), and FIG. 16(C) is a perspective view of a pair of panty hose sewn under the conditions of FIGS. 16(A) and 16(B);

FIG. 17(A) is a plan view showing a state in which the gusset material is fed to the clamp mechanism with a tapered gusset material insertion plate, FIG. 17 (B) is a plan view in which the gusset material insertion plate has withdrawn out of the state of FIG. 17(A), and FIG. 17(C) is a perspective view of a pair of panty hose showing the gusset material sewn under the conditions of FIGS. 17(A) and 17(B);

FIG. 18(A) is a plan view showing a feeding state in which a gusset material is inserted in a tilted position into the clamp mechanism with a straight gusset material insertion plate, FIG. 18(B) is a plan view in which the gusset material insertion plate has been withdrawn out of the state of FIG. 18(A), and FIGS. 18(C) and 18(D) are perspective views of a pair of panty hose showing the gusset material sewn under the conditions of FIGS. 18(A) and 18(B);

FIGS. 20(A) to (F) are explanatory views showing the positioning process of the welt end portion;

FIG. 21(A) is a plan view showing the detecting means for aligning the gusset material inserted in the gusset material insertion plate with the welt end portion of the hose material bitten by the clamp mechanism, and FIGS. 21(B) and 21(C) are perspective views of a pair of panty hose sewn with a positional shift present between the welt end portions of gusset material and hose material;

FIG. 23 shows a first sewing state of the sewing machine in the fifth step, where FIG. 23(A) is a perspective view, FIG. 23(B) is a schematic longitudinal sectional view of FIG. 23(A), and FIG. 23(C) is a perspective view for explaining the state of a seam of the hose;

FIG. 24 shows a second sewing state of the sewing machine in the sixth step, where FIG. 24(A) is a perspective view, FIG. 24(B) is a schematic longitudinal sectional view of FIG. 24(A), and FIG. 24(C) is a perspective view for explaining the state of a seam of the hose;

DETAILED DESCRIPTION OF THE PREFERRED EMBODIMENTS

Hereinbelow, an embodiment of the present invention is described in conjunction with examples thereof as illustrated in the accompanying drawings.

The sewing process of panty hose with a backpanel-like gusset inserted according to the present invention is a process comprising steps of: after the cutting of the inner thigh portions of left-and-right combined cylindrical hose pieces, folding in two lengthwise a backpanel-like gusset material for forming a gusset portion at a site ranging from rear portion to inner thigh portion of the panty part, and inserting the folded gusset material so that the gusset material is pinched between the rear portions of the cut left-and-right cylindrical material pieces and the inner thigh portions, where it is sewn, by which the backpanel-like gusset is inserted at a site ranging from rear portion to inner thigh portion between the left-and-right combined cylindrical material pieces.

Figure 1A:
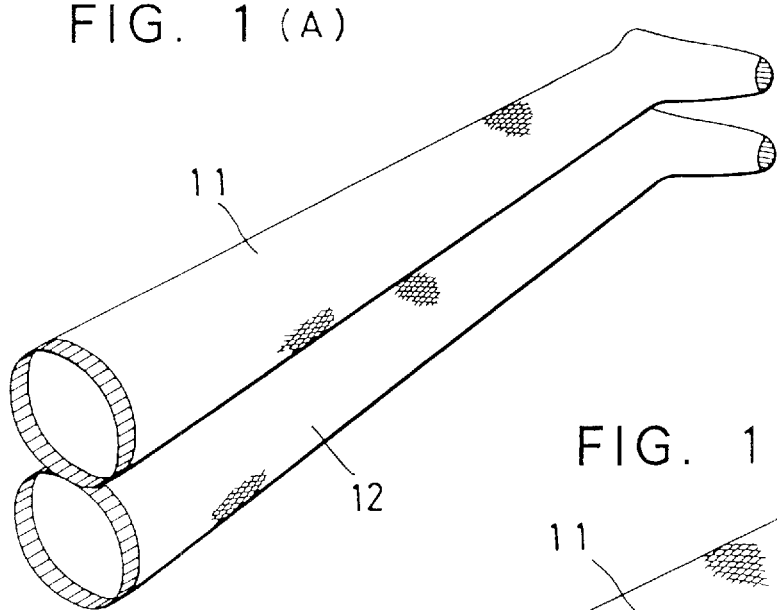
FIGS. 1(A), 1(B), 1(C) are perspective views showing cylindrical hose material, a cutting process, and a state of insertion of the backpanel-like gusset, respectively.
Figure 1B:
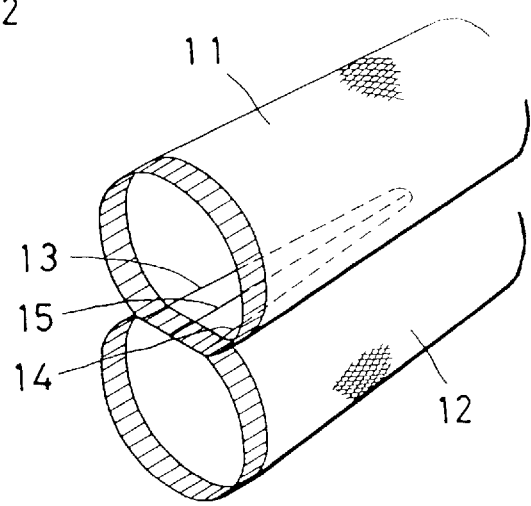
Figure 1C:
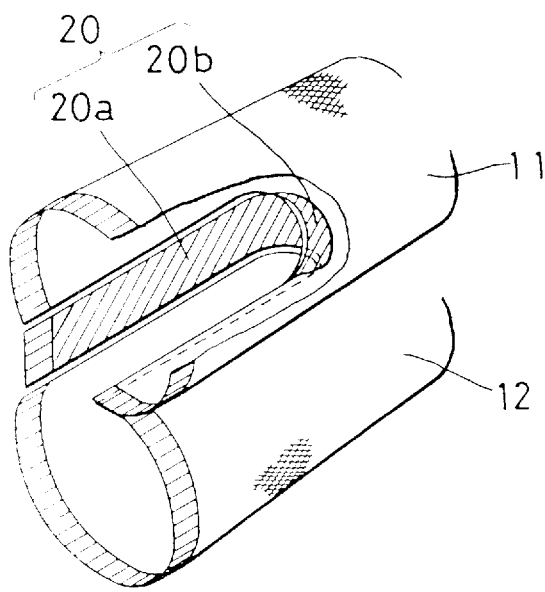
Figure 2:
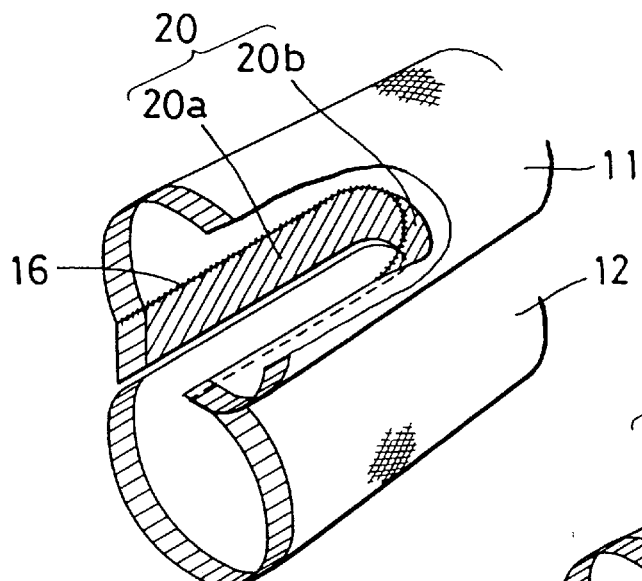
FIGS. 2(A) and 2(B) are perspective views showing seams of the backpanel-like gusset.
FIG. 2(C) is a perspective view showing a finished pair of panty hose.
Figure 2:
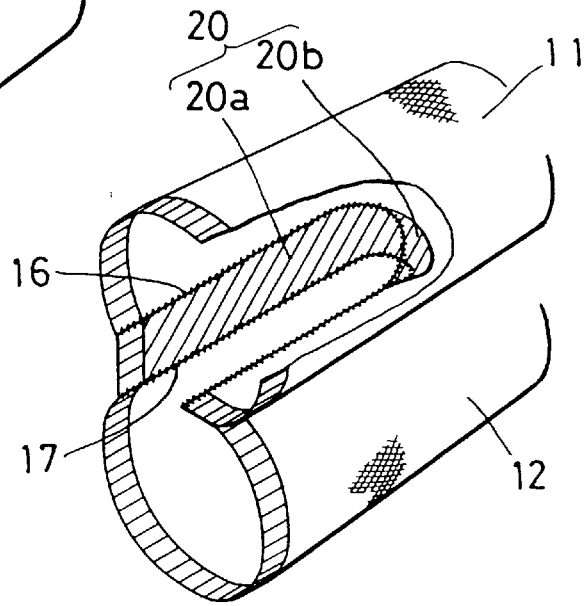
Figure 2:
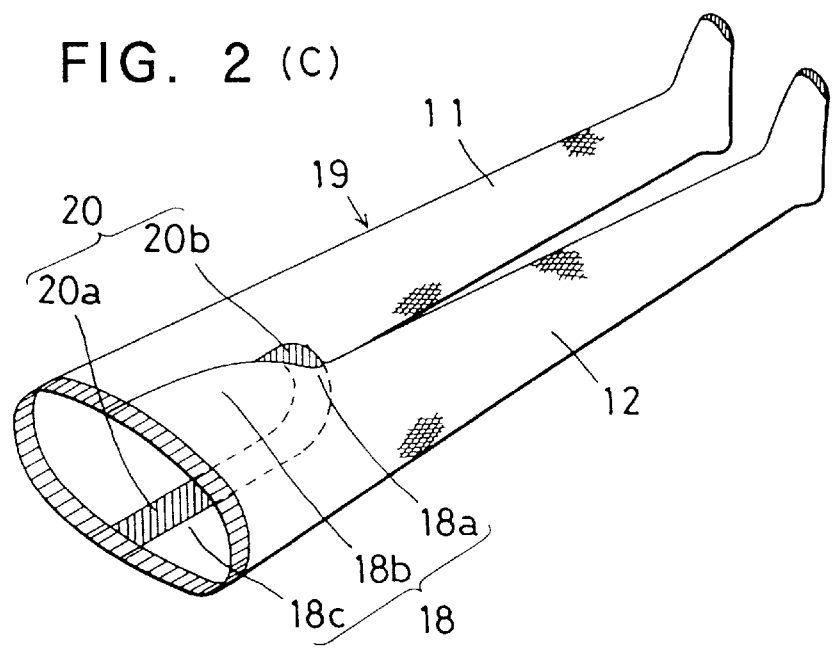

An outline of the sewing process is described in detail with reference to FIGS. 1 and 2. Referring first to FIG. 1(A), reference numerals 11 and 12 denote left-leg and right-leg hose material pieces knitted by an ordinary circular knitting machine. After these left-and-right two hose material pieces 11, 12 are aligned left and right, they are bitten along lines 13, 14 by later-described upper and lower clamps as shown in FIG. 1(B), where middle portions defined between the bite lines 13, 14 is cut out along a broken line 15. Then, as shown in FIG. 1(C), a backpanel-like gusset material 20 is inserted to a portion cut out from central opening portion to crotch portion, which forms the rear portion of the panty part. It is noted that the front portion of the panty part consists only of cut edges of the hose material without the presence of the gusset material. After that, by two-step sewing machine process, first a seam 16 as shown in FIG. 2(A) and then a seam 17 as shown in FIG. 2(B) are formed in parallel with the bite lines 13, 14. Thus, a pair of panty hose 19 with the backpanel-like gusset 20 inserted from a rear portion 18c (a strip-shaped gusset portion 20a) to an inner thigh portion 18a (V-shaped gusset portion 20b) of a panty part 18 as shown in FIG. 2(C) is obtained.

In the panty hose 19 with a backpanel-like gusset inserted, which has been produced in this way, unlike the conventional panty hose with a diamond-shaped gusset inserted, the rear portion 18c of the panty part 18 has margins in size and besides the gusset material 20 is expandable and contractible longitudinally and laterally. Thus, the pair of panty hose 19 not only well fits the wearer's hip portion but also becomes comfortable to wear without causing stuffiness in a range from the hip portion to the inner thigh portion. Further, with the insertion of this backpanel-like gusset material 20, the stretch of the hip portion to the inner thigh portion during motion of the wearer is decreased, which solves the disadvantage that the product may break at the seam portions.

Next, the sewing process of the panty hose with a backpanel-like gusset inserted is explained concretely with reference to FIGS. 3 through 24.

Figure 3:
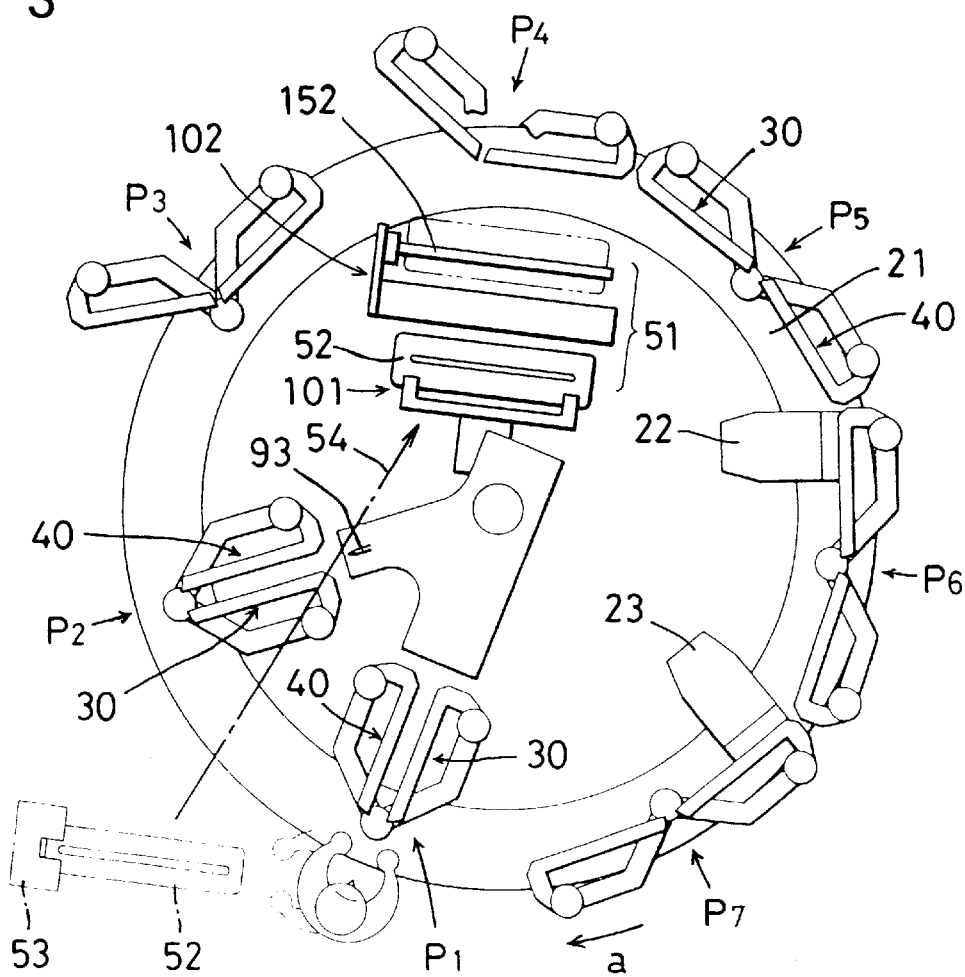
FIG. 3 is an outlined plan view showing an embodiment of the apparatus for embodying the invention method.

FIG. 3 is a plan view outlining a sewing apparatus for embodying the invention method. In this sewing apparatus, clamp mechanisms each comprising a left-and-right pair of clamp groups 30, 40 are installed on a slide disc 21, which runs intermittently along a direction of arrow "a" on a circumferential orbit, at regular intervals in the running direction. Positions at which each clamp mechanism is to be stopped are set in succession, comprising a material loading position $P_1$ where a pair of hose material is loaded, a cut position $P_2$ where central opening portion to crotch portion of the hose material bitten by the clamp mechanism is cut out, a material expanding position $P_3$ where cut edges are separated from each other above and below, a gusset material inserting position $P_4$ where gusset material is bitten together with the hose material by the clamp mechanism, an angle changing position $P_5$ where the clamp mechanism with the gusset material inserted is changed to an angle for sewing, a first sewing position $P_6$ where the hose material and the gusset material are sewn together by a first sewing machine 22, and a second sewing position $P_7$ where the remaining cut edges of the hose material and the gusset material are sewn together by a second sewing machine 23.

A gusset material feed mechanism 51 is placed inside the gusset material inserting position $P_4$ so as to face the clamp mechanism. A gripping mechanism 53 for gripping a gusset material insertion plate 52 is placed beside the material loading position $P_1$. The gusset material insertion plate 52 after the gusset material has been inserted therein is conveyed by a gusset material conveyor mechanism 54 which conveys it toward the gusset material feed mechanism 51.

The gusset material feed mechanism 51 comprises a welt-end-portion positioning mechanism 101 which receives the gusset material insertion plate 52 conveyed up by the gusset material conveyor mechanism 54, and which holds horizontal and feeds forward the gusset material insertion plate 52, and an inverting and holding mechanism 102 which receives the gusset material insertion plate 52 from the receives the gusset material insertion plate 52 from the positioning mechanism 101 and feeds the gusset material 20 to between the clamps located at the gusset material inserting position $P_4$. At the gusset material inserting position $P_4$, are provided first detecting means 103 for detecting one welt end portion of the cut edges of hose material 11 bitten by the clamp mechanism, and second detecting means 104 for detecting a welt end portion of the gusset material 20 inserted in the gusset material insertion plate 52 (see FIG. 11).

Referring to the clamp mechanism, which includes one clamp group 30 and the other clamp group 40, as shown in FIGS. 4 through 7, the one clamp group 30 comprises upper and lower clamps 32, 33 supported on a pivoting arm 31, and an upper middle clamp 34 and a lower middle clamp 35 located between the upper and lower clamps 32, 33, while the other clamp group 40 also comprises upper and lower clamps 42, 43 supported on a pivoting arm 41, and an upper middle clamp 44 and a lower middle clamp 45 located between the upper and lower clamps 42, 43.

The left and right arms 31, 41 are held on one pivot so as to be pivotable. Accordingly, with the pivotal movement of the arms 31, 41, the one clamp group 30 and the other clamp group 40 are enabled to open from a mutually parallel state (the state of the material loading position $P_1$ of FIG. 3) to a gusset material insertion angle over the circumferential orbit line (the state of the positions $P_3$, $P_4$ in FIG. 3) and to open to a sewing angle in alignment with the circumferential orbit line (the state of the positions $P_5$–$P_7$ in FIG. 2), or conversely to close from the state of alignment with the circumferential orbit line to the parallel state.

Figure 5:
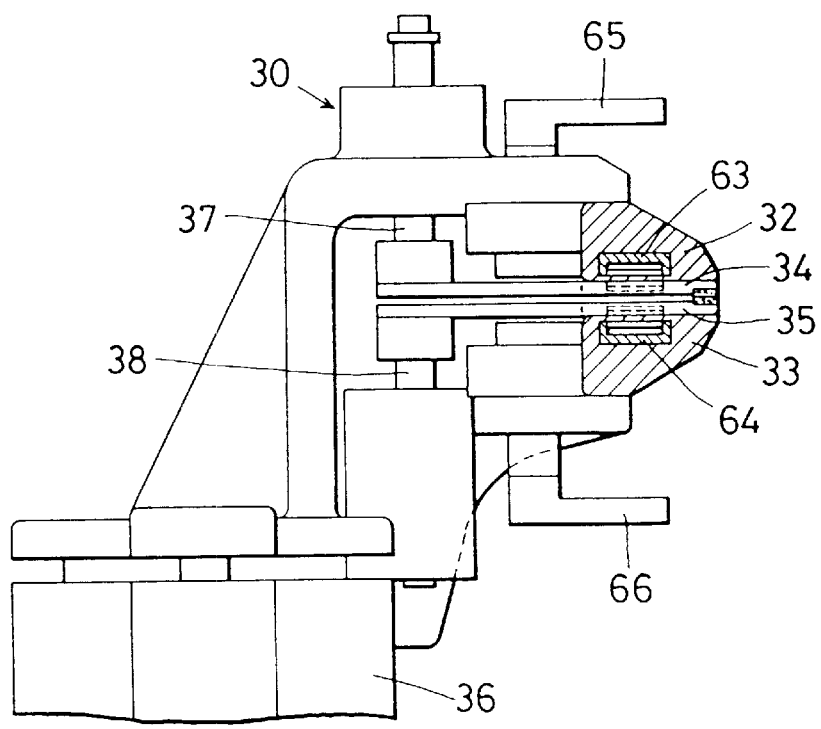
FIG. 5(A) is a longitudinal side view of the clamp groups in the clamp mechanism.
FIG. 5(B) is a longitudinal side view in which main part of the same is enlarged.
Figure 5:
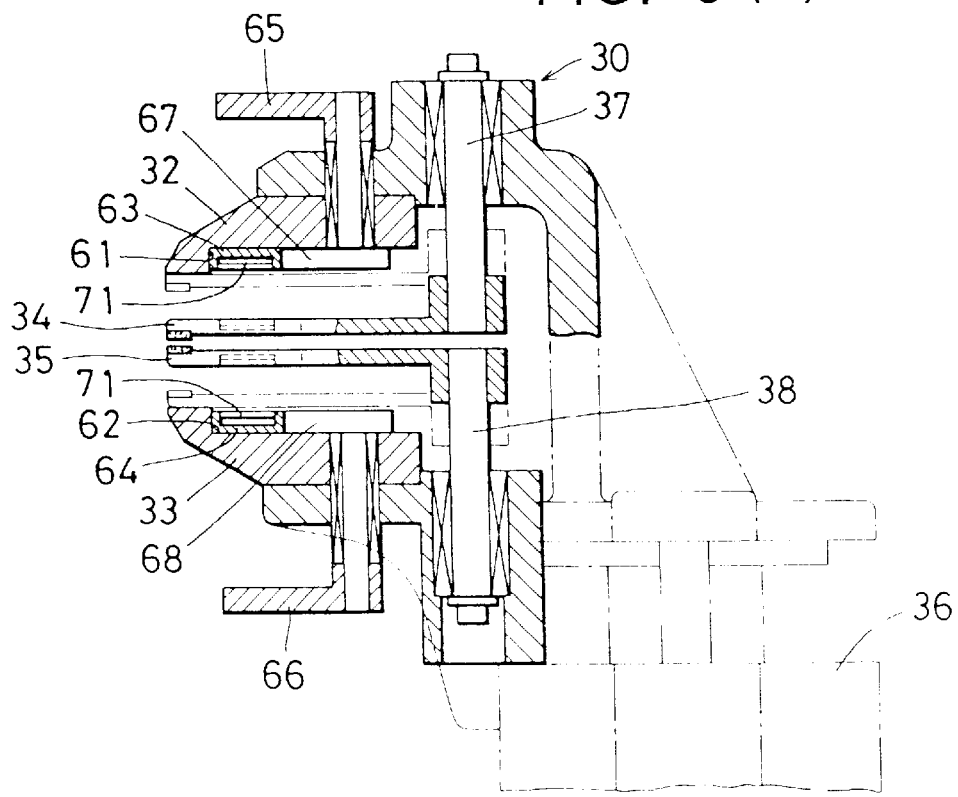

The upper and lower clamps 32, 33 or 42, 43 can be moved up and down so as to approach each other or separate from each other by means of electromagnets 36, 46, respectively. The upper middle clamps 34, 44 as shown in FIG. 5 are movable up and down against the upper clamps 34, 42, respectively, by guide of a pivot 37, while the lower middle clamp 35, 45 are movable up and down against the lower clamps 33, 43, respectively, by guide of a pivot 38. When the upper and lower clamps 32, 33 or 42, 43 are moved to approach each other (the state of FIG. 5(A)), the middle clamps 34, 35 or 44, 45 are overlaid on each other sandwiched between their opposing surfaces, and when they are moved to separate from each other (the state of FIG. 5(B)), the middle clamps 34, 35 or 44, 45 are separated up and down between their opposing surfaces.

Between the upper clamp 32, 42 and the upper middle clamp 34, 44 and between the lower clamp 33, 43 and the lower middle clamp 35, 45, are provided magnet mechanisms for attracting and separating the upper clamp 32, 42 and the upper middle clamp 34, 44 to and from each other.

Figure 6A:
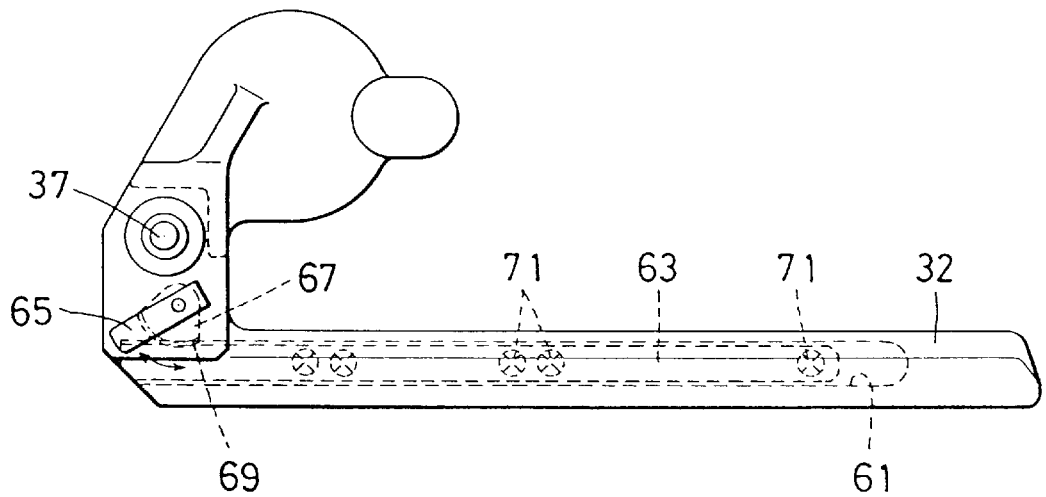
FIG. 6(A) is a plan view of the upper clamp in the clamp group.
Figure 6B:
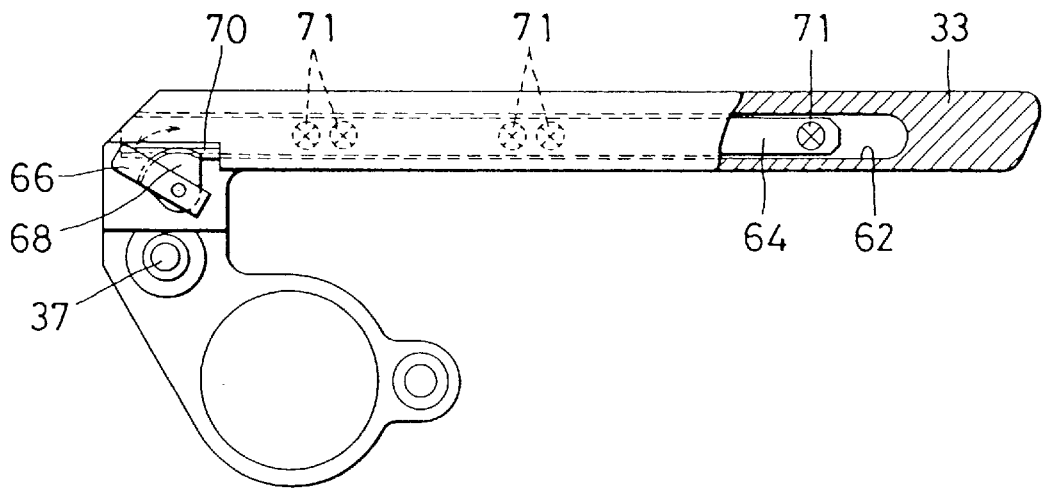
FIG. 6(B) is a partly cut-out plan view of the lower clamp.
Figure 6C:
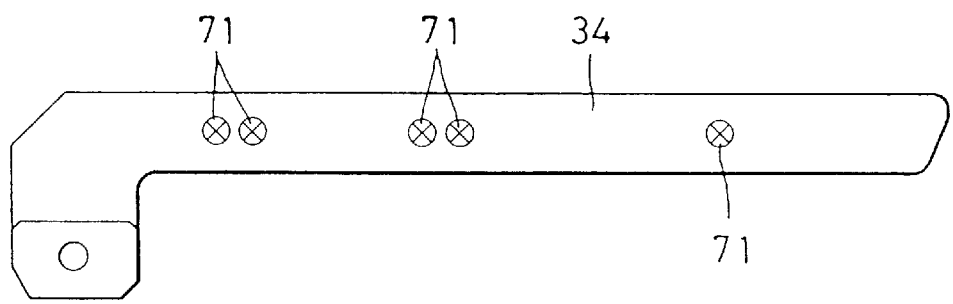
FIG. 6(C) is a plan view of the middle clamp.

The magnet mechanisms in both clamp groups 30, 40 are of equal structure, and so only a magnet mechanism for one clamp group 30 is illustrated in FIGS. 5 to 7 with omission of the description of the other clamp group 40.

In the magnet mechanism, recesses 61, 62 are formed lengthwise in the lower surface of the upper clamp 32 and in the upper surface of the lower clamp 33, and slide bars 63, 64 are movably housed in these recesses 61, 62 lengthwise, respectively. Sector pinion gears 67, 68 which are fitted to root-side end portions of the upper clamp 32 and the lower clamp 33 so as to be pivoted by levers 65, 66, respectively, are engaged with racks 69, 70 which are formed at end portions of the slide bars 65, 66, so that the slide bars 63, 64 are given back-and-forth movement of a fixed stroke by pivoting operation of the levers 65, 66, respectively.

In opposing faces of the slide bars 63, 64 and the upper middle clamp 34 or the lower middle clamp 35, permanent magnets 71 are buried with specified intervals lengthwise.

Figure 7A:
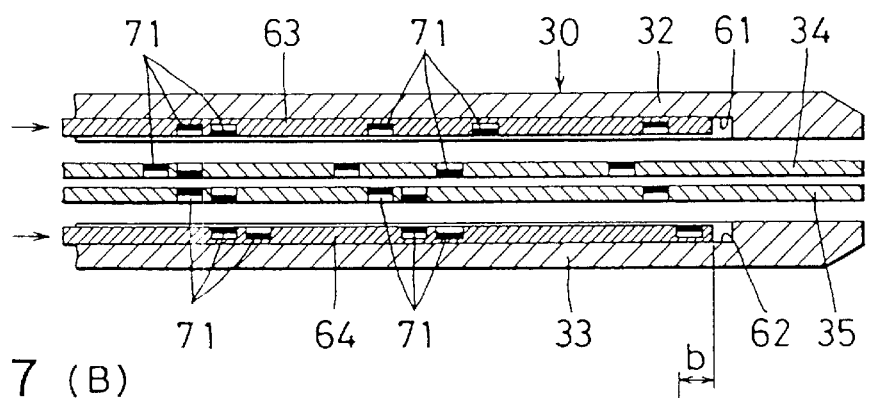
FIGS. 7(A) and 7(B) are longitudinal sectional views showing main part of the clamp group.
Figure 7B:
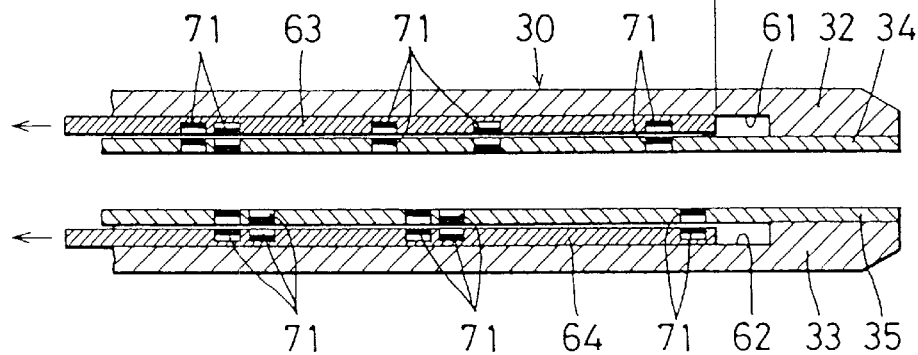

As shown in FIGS. 6 and 7, the arrangement of the permanent magnets 71 is so set that when the slide bar 63, 64 is positioned on one end side, up-and-down opposing permanent magnets 71 repel each other with their like poles facing each other (the state of FIG. 7(A)), and that when the slide bar 63, 64 has moved by the stroke "b", the up-and-down opposing permanent magnets 71 are attracted up to each other with their unlike poles facing each other (the state of FIG. 7(B)).

Like this, separation and attraction between the upper clamp 32 and the upper middle clamp 33 and between the lower clamp 34 and lower middle clamp 35 are effected by pivoting operation of the levers 65, 66.

Figure 9:
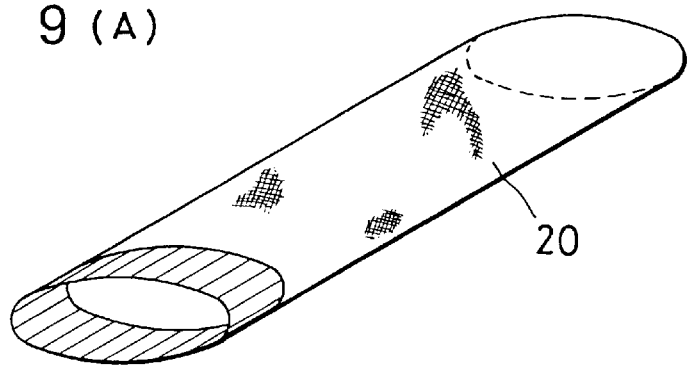
FIGS. 9(A) is a perspective view of the gusset material.
FIG. 9(B) is a perspective view of the gusset material insertion plate.
FIG. 9(C) is a perspective view showing another example of the gusset material insertion plate.
Figure 9:
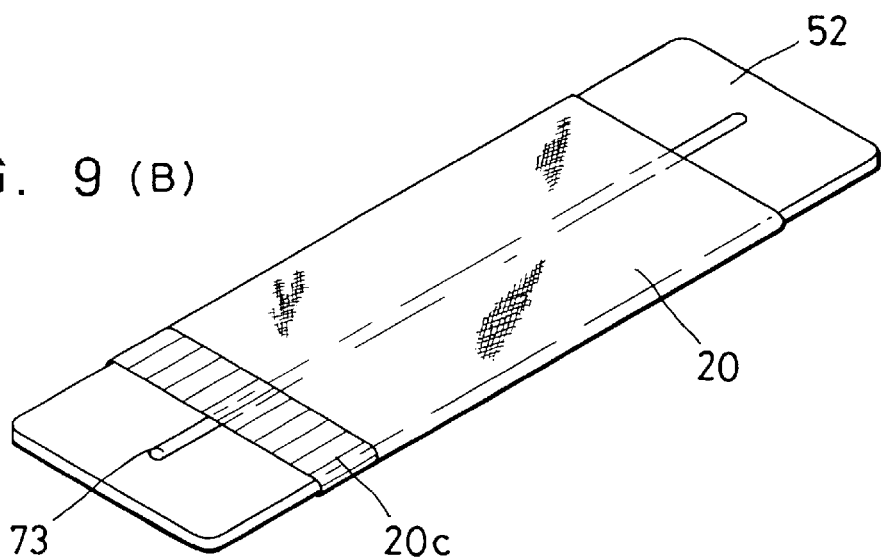
Figure 9:
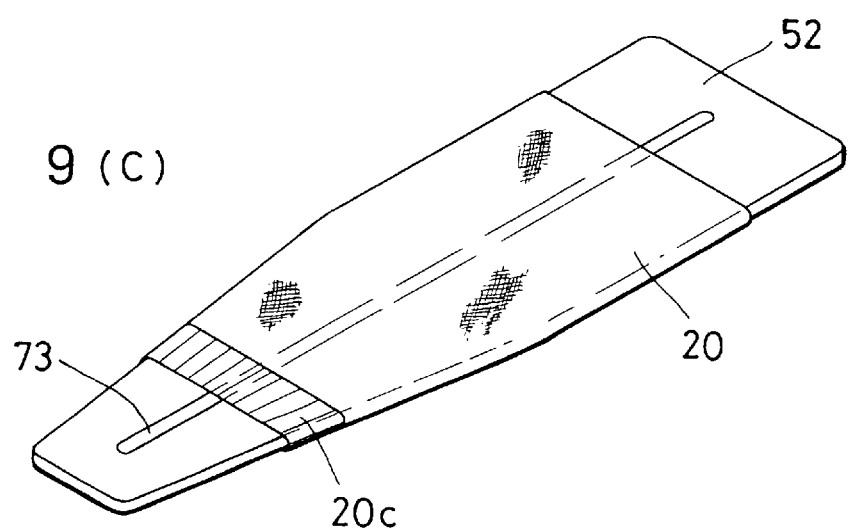

FIG. 9 shows the gusset material 20, which has previously been cylindrical shaped. The gusset material insertion plate 52 is used to convey the gusset material 20 toward the gusset material feed mechanism 51 by the gusset material conveyor mechanism 54 as shown in FIG. 9(B), (C).

This example of the gusset material insertion plate 52 shown in FIG. 9(B) is formed into a straight rectangular shape, where a slit 73 for gusset material cutting is formed longitudinally in central portion of the rectangular shape.

The gusset material insertion plate 52 in the example shown in FIG. 9(C) is tapered into a narrower width at one side end portion (welt side). In this case, the gusset material 20, when inserted in the clamp mechanism, is narrowed in width toward the waist side.

In the case of the gusset material insertion plate 52 of the example shown by FIG. 9(C), which is tapered in smaller width on the welt side, as described later, the gusset material sewn to the hose material shows such a kite shape as to be smaller in width on the welt side and get increasingly larger in width toward the hip portion. As a result, when in use, the product pair of panty hose fits at its waist portion while its portion ranging from hip portion to inner thigh portion accords with the bodily shape of the wearer, thus comfortable to wear advantageously.

Figure 11:
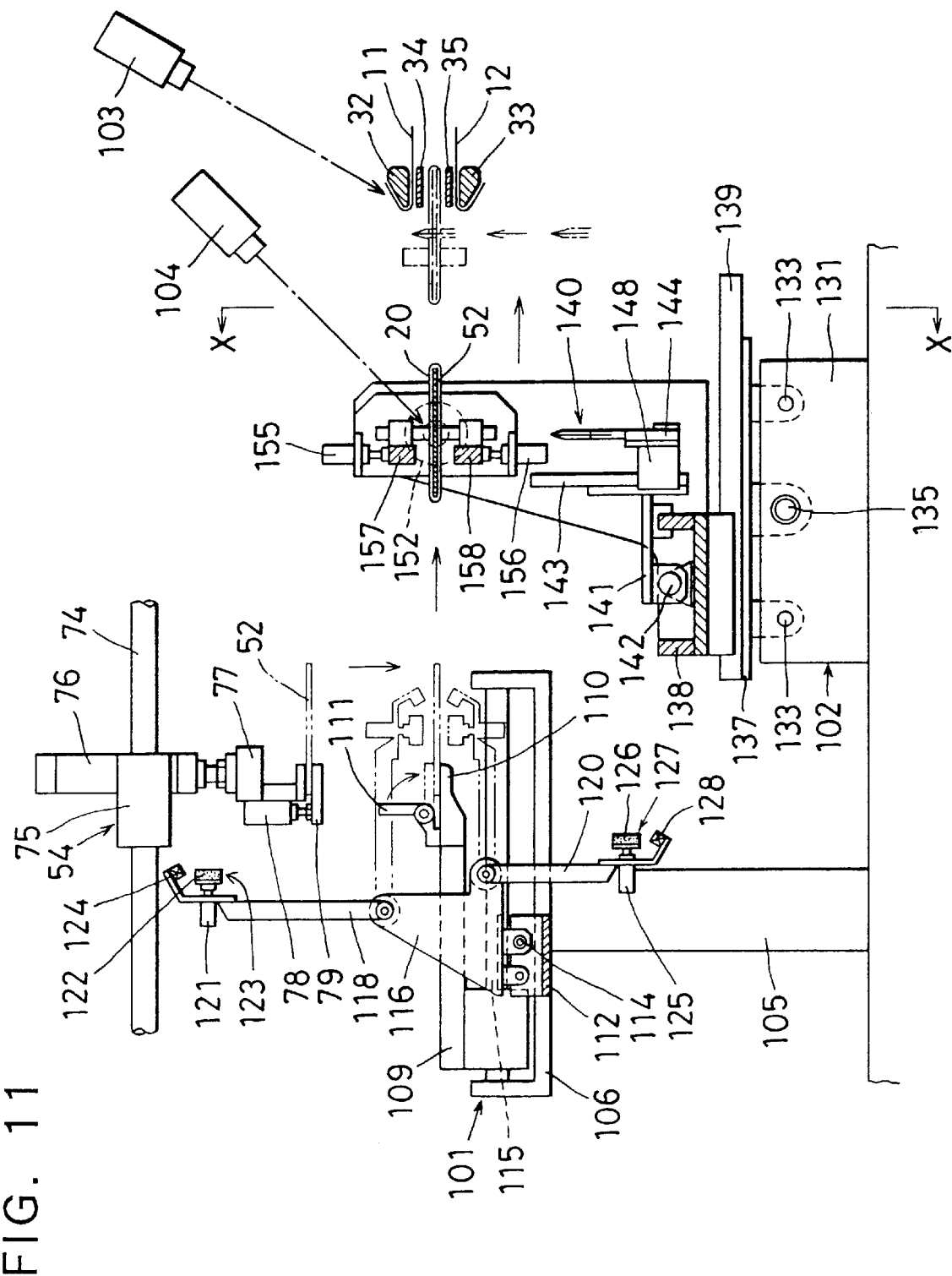
FIG. 11 is a longitudinal side view of the same.

In order to insert the cylindrical gusset material 20 into the gusset material insertion plate 52, as shown in FIG. 3, the gripping mechanism 53 for pinching one end portion of the insertion plate 52 is placed beside the material loading position $P_1$. The gusset material conveyor mechanism 54 for receiving the gusset material insertion plate 52 from the gripping mechanism 53 and conveying it to the section of the gusset material feed mechanism 51, as shown in FIG. 11, comprises a traveler 75 75 which travels along a guide rail 74 placed above the gripping mechanism 53 and the gusset material feed mechanism 51, an up/down mover 77 which is moved up and down by a cylinder 76 and which is provided to the traveler 75, and a chuck 79 which is provided below the up/down mover 77 and which is opened and closed by a cylinder 78. The gusset material insertion plate 52 is pinched at a central portion of its longitudinal one side edge by the chuck 79 and conveyed as such.

Figure 10:
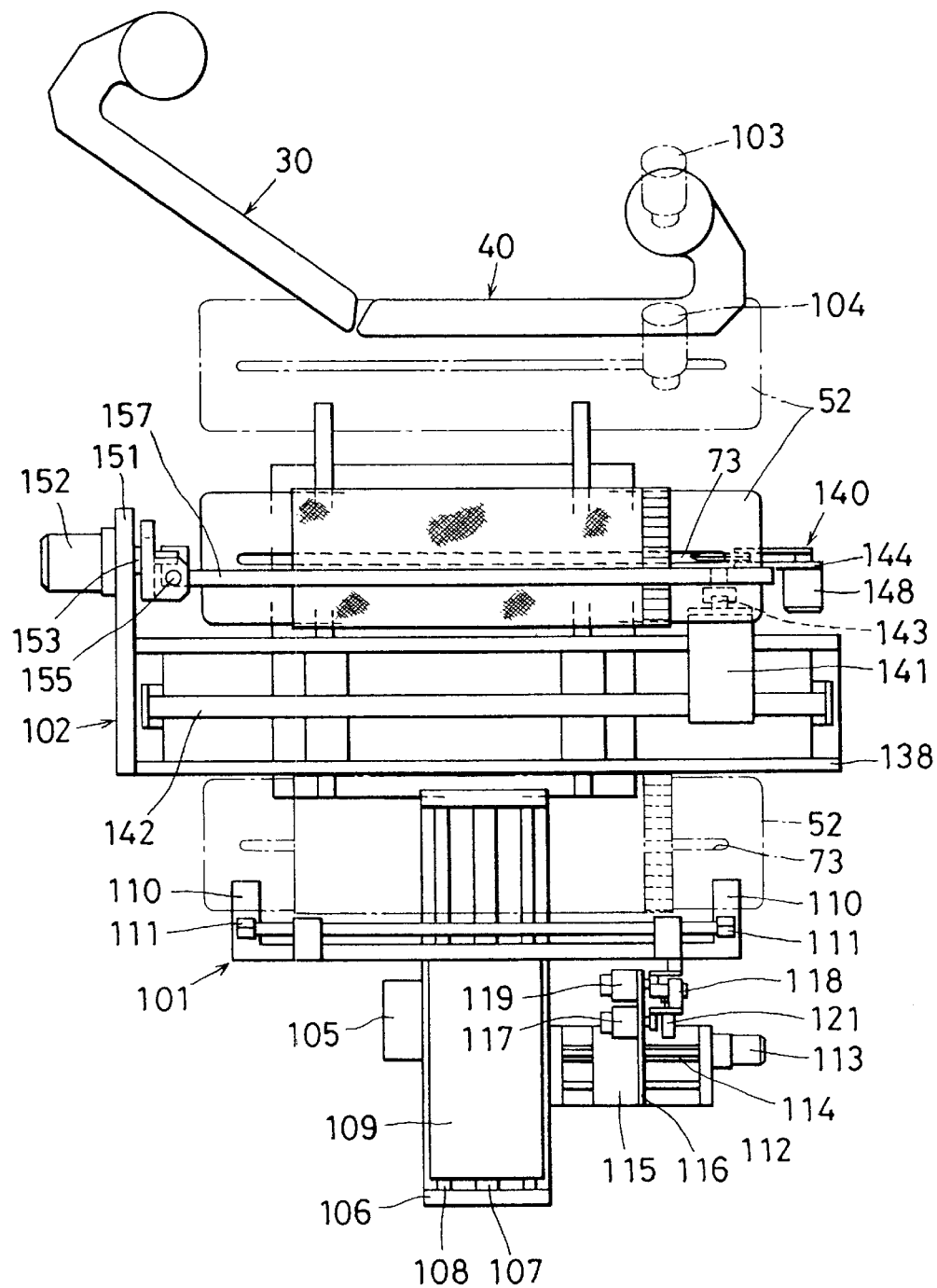
FIG. 10 is a plan view showing the welt-portion positioning mechanism and the inverting and holding mechanism.

The welt-end-portion positioning mechanism 101 of the gusset material feed mechanism 51, as shown in FIGS. 10 and 11, is disposed just under a place where the chuck 79 of the gusset material conveyor mechanism 54 is stopped at its most advanced position. In the welt-end-portion positioning mechanism 101, a U-shaped bracket 106 is fixed to an upper end of a support 105 erected on the floor, and within the bracket 106 is provided a movable base 109 which advances and retreats along a guide shaft 108 with respect to the clamp mechanism that is stopped at the gusset material inserting position $P_4$. Further, receiving claws 110 for supporting both ends of the gusset material insertion plate 52 are provided at tip ends of the movable base 109, and gripping claws 111 which is raised and fallen by cylinder or the like are provided on the receiving claws 110, respectively. In the state of FIG. 11 in which the movable base 109 is stopped in the retreat position, when the chuck 79 of the gusset material conveyor mechanism 54 has lowered, both end portions of the gusset material insertion plate 52 are rested on the receiving claws 110, and thereafter the gripping claws 111 are fallen down, thereby pinching both end portions of the gusset material insertion plate 52, with the chuck 79 opened and separated from the gusset material insertion plate 52. Thus, the gusset material insertion plate 52 is delivered from the gusset material conveyor mechanism 54 to the welt-end-portion positioning mechanism 101.

A shorter bracket 112 is fixed horizontal on one side face of the bracket 106 and on the side on which a welt portion 20c of the gusset material 20 inserted in the gusset material insertion plate 52 is positioned. Within this shorter bracket 112, is provided a movable plate 115 which is movable perpendicularly to the movable base 109 by a feed screw shaft 114 driven by a motor 113. An upper arm 118 which is raised and fallen by a motor 117 is pivotally held at an upper end of a standing bracket 116 erected on the movable plate 115, while a lower arm 120 which is given pivotal motion horizontally from a vertically lowered position by a motor 119 is pivotally held at a lower front edge of the standing bracket 116.

Pivotally held points of the upper and lower two arms 118, 120 are positioned rearward of the receiving claws 110 that is in the retreat position and, in terms of height, above and below the receiving claws 110 as shown in FIG. 11. An upper grip 123 for advancing and retreating a presser 122 by a cylinder 121 is provided at a tip end of the upper arm 118, while a sensor 124 for detecting the upper welt end portion of the gusset material 20 inserted in the gusset material insertion plate 52 is provided at a tip-end side position of the upper grip 123.

Also, a lower grip 127 for advancing and retreating a presser 126 by a cylinder 125 is provided at a tip end of the lower arm 120, and a sensor 128 for detecting a lower welt end portion of the gusset material 20 inserted in the gusset material insertion plate 52 is provided at a tip-end side position of the lower grip 127. With the upper and lower upper arms 118, 120 positioned horizontal, the upper grip 123 and the lower grip 127 are press contact upper and lower portions of the gusset material 20 inserted in the gusset material insertion plate 52, respectively.

Figure 19A:
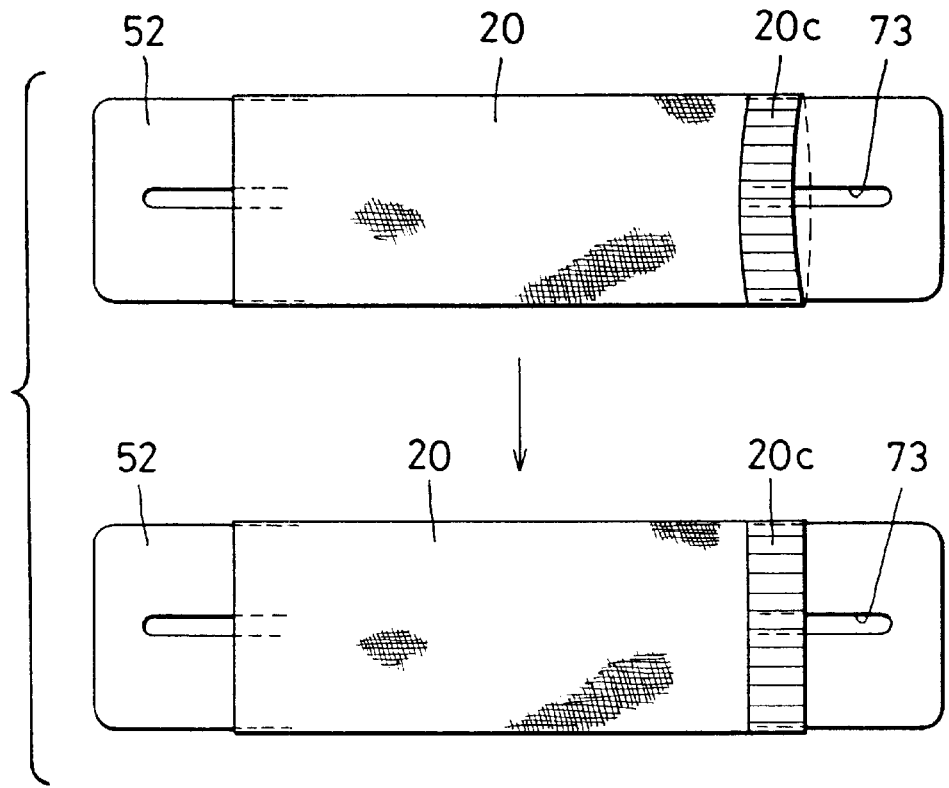
FIG. 19(A) is a plan view showing a vertical positional shift as well as its corrected state, respectively, of the welt end portion of the gusset material inserted into the gusset material insertion plate.

FIGS. 19(A), (B) and FIGS. 20(A) to (F) show working process for positioning upper and lower positions of the welt end portion of the gusset material 20 inserted in the gusset material insertion plate 52 supported by the welt-end-portion positioning mechanism 101. The gusset material 20 inserted in the gusset material insertion plate 52 is shown in FIG. 19(A) by an example in which the welt end portion 20c has its upper face side shifted in position to the left in the figure with respect to its lower face side.

While the gusset material insertion plate 52 is held horizontal by the receiving claws 110 and the gripping claws 111 of the welt-end-portion positioning mechanism 101, the upper arm 118 pivots downward and the lower arm 120 pivots upward. Then, as shown by solid line in FIG. 20(A), the presser 122 of the upper grip 123 and the presser 126 of the lower grip 127 are positioned close to the upper and lower surfaces of the gusset material 20.

In this state, the motor 113 of FIG. 10 starts up, so that the upper and lower upper grips 123, 127 are moved rightward in FIG. 20(A). Then, as shown by two-dot chain line in the same figure, when the sensor 124 of the upper grip 123 has detected the absence of material, the presser 122 of the upper grip 123 lowers, press holding the welt portion of the upper surface.

In this state, as shown in FIG. 20(B), the upper and lower grips 123, 127 move further forward, so that the upper welt portion integrally moves by the holding of the upper grip 123. Then, when the sensor 128 of the lower grip 127 has detected the absence of material, the upper grip 123 moves upward as shown in two-dot chain line in the same figure, releasing the holding of the upper welt portion, so that the upper welt portion is slightly returned by elasticity, so that the upper and lower grips 123, 127 move further forward by a previously set distance, thus being completely separated from the welt portion (solid line position of FIG. 20(C)).

Next, as shown by two-dot chain line in FIG. 20(C), the upper and lower grips 123, 127 retreat from the advance position. When the sensor 128 of the lower grip 127 has detected the presence of material, the sensor 128 of the lower grip 127 moves up, holding lower welt portion.

As shown in FIG. 20(D), from the state as shown above, the upper and lower grips 123, 127 further retreat. When the sensor 124 of the upper grip 123 has detected the presence of material, the presser 122 of the upper grip 123 lowers to hold the upper welt portion. Thus, the welt portion (20c) of the gusset material 20 on the gusset material insertion plate 52 is held from above and below by the upper and lower grips 123, 127.

As shown in FIG. 20(E), while keeping the above holding state, the upper and lower grips 123, 127 further retreat by a previously set distance. By this retreat, the gusset material 20 is pulled up in a wrinkled state on the gusset material insertion plate 52.

From the above retreat position, as in FIG. 20(F), the upper and lower grips 123, 127 advance again, and after an advance to a previously set specified distance, the upper and lower grips 123, 127 move up and down. Then, releasing the holding of the upper and lower welt portions allows the welt portion 20c of the gusset material 20 to be positioned in a vertical line as shown in lower part of FIG. 19(A).

In this way, once the welt-end-portion positioning mechanism 101 has positioned the upper and lower welt portions 20c of the gusset material 20 in line, the receiving claw 110 and the gripping claw 111 are moved forward by operation of the cylinder 107, so that the gusset material insertion plate 52 is fed to the inverting and holding mechanism 102 provided between the welt-end-portion positioning mechanism 101 and the gusset material inserting position $P_4$.

Figure 19B:
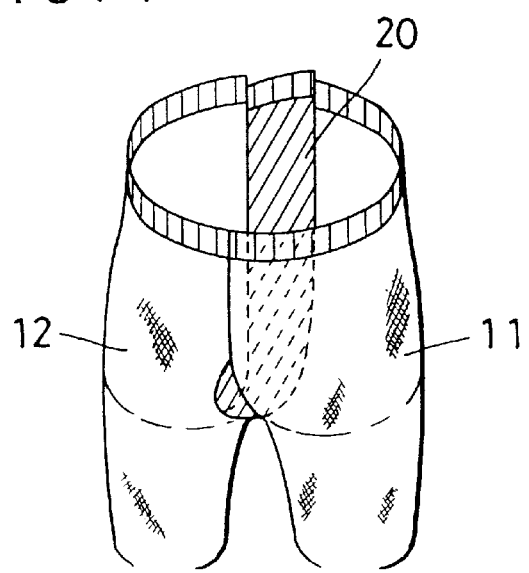
FIG. 19(B) is a perspective view of a pair of panty hose sewn in the state that a positional shift is present in the welt end portion of the gusset material.

In addition, if the upper and lower welt portions 20c of the gusset material 20 loaded to the gusset material insertion plate 52 are coincident with each other, sewing the panty hose as it is would result in a positional shift of the welt portion, as shown in FIG. 19(B).

Figure 12A:
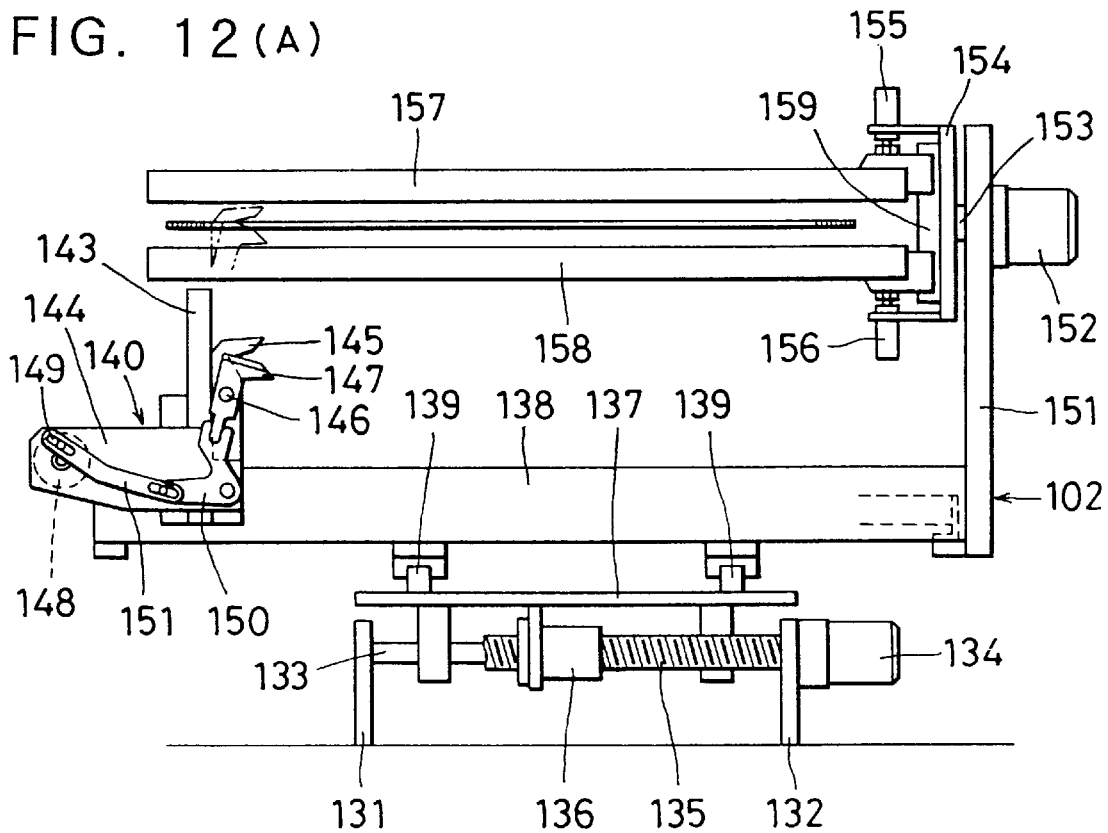
FIG. 12(A) is a rear view taken along the arrow X—X of FIG. 11, and FIGS. 12(B) and 12(C) are sectional views for explaining the inverting and feeding of the welt portion.

In the inverting and holding mechanism 102, as shown in FIGS. 10 to 11 and FIG. 12(A), a plurality of guide shafts 133 and a feed screw shaft 135 driven by a pulse motor 134 are installed in parallel with one another between opposing fixed plates 131, 132. In upper part between the fixed plates 131, 132, a nut member 136 supported by the guide shaft 133 and fixed at a lower portion is screwed to the feed screw shaft 135, while a base plate 137 which is movable with rotation of the pulse motor 134 lengthwise of the gusset material insertion plate 52 is disposed.

A longitudinal bracket 138 which is longer than the gusset material insertion plate 52 is placed on a base plate 137 so that the bracket 138 becomes movable along guide rails 139 provided on the base plate 137 widthwise of the gusset material insertion plate 52 by means of a driving source such as a cylinder. Further, a scissor mechanism 140 for cutting and dividing in two the gusset material 20 inserted into the gusset material insertion plate 52 is loaded to the longitudinal bracket 138 so that the scissor mechanism 140 becomes movable lengthwise of the gusset material insertion plate 52.

In this scissor mechanism 140, a horizontal slide plate 141 disposed on the upper surface of the longitudinal bracket 138 is coupled to a rodless cylinder 142 fixed lengthwise of the longitudinal bracket 138 so that the slide plate 141 becomes movable lengthwise of the longitudinal bracket 138. Besides, a fixed scissor 145 standing upright on the front side of an up/down plate 144 which can be moved up and down by a cylinder or the like, and a movable scissor 147 which pivots about a pivot shaft 146 are provided so that the movable scissor 147 interlocks with the an eccentric rotating shaft 149 of a motor 148 fixed to the up/down plate 144 via links 150, 151. The movable scissor 147 is swung with rotation of the motor 148, and capable of cutting the gusset material 20 together with the fixed scissor 145.

An erect bracket 151 is fixed to an end portion of the longitudinal bracket 138, and a plate 154 is fixed to a shaft 153 of a rotational motor 152 fixed to an upper end of the erect bracket 151. A pair of upper and lower inverting and holding devices 157, 158 are supported at their one end on cylinders 155, 156 provided at upper and lower end portions of the plate 154.

The inverting and holding devices 157, 158 using a little longer than the gusset material insertion plate 52 are guided at their end side coupled to the cylinders 155, 156 by a guide 159 provided on the plate 154, so that the inverting and holding devices 157, 158 are made to approach to and separate from each other by activation of the cylinders 155, 156, and besides given an up-and-down inverting rotation by the rotational motor 152 about a central axis of the motor 152.

The inverting and holding devices 157, 158 extend from the erect bracket 151 lengthwise of the longitudinal bracket 138, and as shown in FIG. 12, the up-and-down opened inverting and holding devices 157, 158 become coincident at their gap with the gusset material insertion plate 152 held by the welt-end-portion positioning mechanism 101. After the positioning of the upper and lower welt portions, the welt-end-portion positioning mechanism 101 moves forward to insert the gusset material insertion plate 52 into between the opened inverting and holding devices 157, 158. At this insertion position, the upper and lower inverting and holding device 157, 158 get close to each other, pinches the gusset material insertion plate 52 from above and below at a position in the rear of the slit 73 provided in the center of the gusset material insertion plate 52, and receives the gusset material insertion plate 52 from the welt-end-portion positioning mechanism 101, so that the center of rotation by the rotational motor 152 and the center line of the gusset material insertion plate 52.

The scissor mechanism 104 is placed so that the fixed scissor 145 and the movable scissor 147 are positioned just under the slit 73 of the gusset material insertion plate 52 held by the inverting and holding devices 157, 158. In an upward movement, the scissor mechanism 140 cuts the gusset material 20 at its portion located at the slit 73.

Figure 12B:
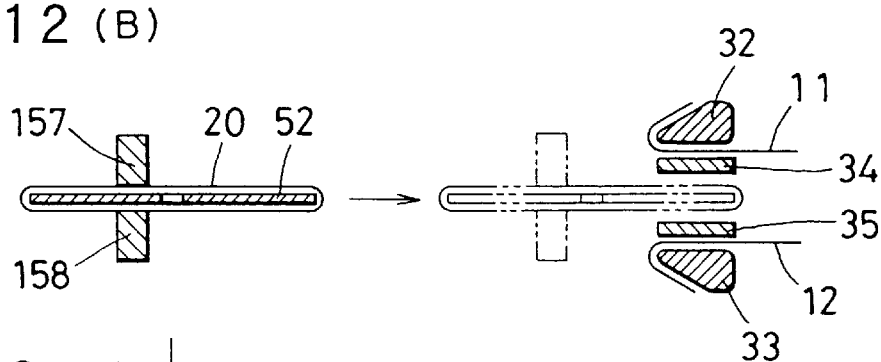

In the state that the inverting and holding mechanism 102 standing by in the retreat position shown by solid line in FIG. 11 is opened up and down as shown in FIG. 12, the welt-end-portion positioning mechanism 101 moves forward so that the gusset material insertion plate 52 after having positioned the upper and lower welt portions enters into between the upper and lower inverting and holding devices 157, 158. While the center line is coincident with the center of rotation by the motor 152, the inverting and holding devices 157, 158 are closed to hold the gusset material insertion plate 52. Then, the welt-end-portion positioning mechanism 101 after deliver of the gusset material insertion plate 52 returns to the retreat position. The inverting and holding mechanism 102 that has held the gusset material insertion plate 52 by the upper and lower inverting and holding devices 157, 158 then moves to an advance position as shown by two-dot chain line in FIG. 11, and the fore end portion of the gusset material insertion plate 52 enters into the clamp mechanism standing by in the gusset material inserting position P$_4$, where the clamp mechanism closes to bite the gusset material insertion plate 52 as shown in FIG. 12(B). With the gusset material insertion plate 52 bitten by the clamp mechanism, then the scissor mechanism 140 goes up that has stood under the fore end side of the inverting and holding devices 157, 158 as shown in FIG. 12, and the upper-end fixed scissor 145 enters into the slit 73 of the gusset material insertion plate 52. In this state, the motor 148 rotates so that the movable scissor 147 swings, while the scissor mechanism 140 is moved by activation of the rodless cylinder 142 lengthwise of the slit 73, cutting lengthwise in two divisions the gusset material 20 inserted in the gusset material insertion plate 52.

When the gusset material 20 on the gusset material insertion plate 52 is cut into two divisions, the inverting and holding mechanism 102 returns from the advance position to the retreat position, where the gusset material insertion plate 52 escapes out of the clamp mechanism with one division of the gusset material 20 left in the clamp mechanism.

Figure 12C:
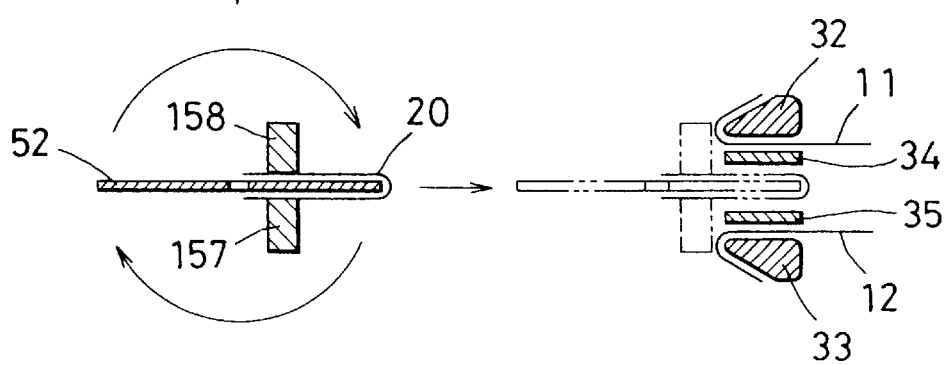
Figure 13:
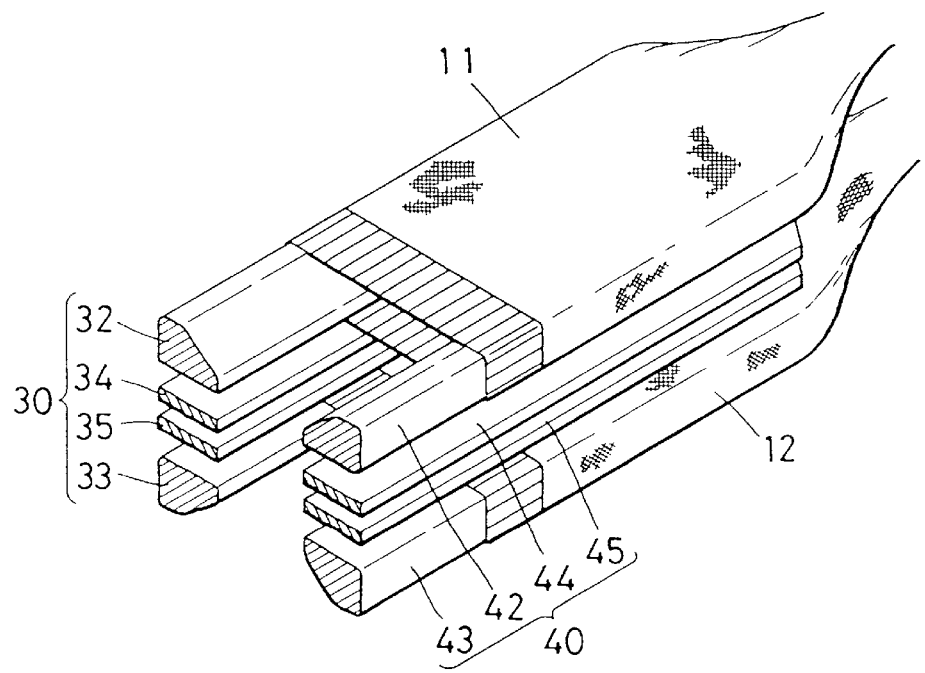
FIG. 13 is a perspective view showing a loading state of the hose material in the clamp mechanism.

When the inverting and holding mechanism 102 has returned to the retreat position, the gusset material insertion plate 52 is inverted 180° as shown in FIG. 12(C) by the rotation of the motor 152. As a result, the two-divided gusset material 20 that has been remaining in the gusset material insertion plate 52 is directed forward in the direction in which the inverting and holding mechanism 102 moves, thus ready for the insertion of the next clamp mechanism.

FIG. 12(C) shows a state in which the gusset material is inserted into the next clamp mechanism. As the gusset material insertion plate 52 enters into the commercial and is bitten by the clamp mechanism, the inverting and holding devices 157, 158 are opened above and below, jetting out air toward the cut edges of the gusset material so that the cut edges of the gusset material are blown away above and below. After this, the inverting and holding devices 157, 158 are closed again to directly hold the gusset material insertion plate 52, and retreating to pull out the gusset material insertion plate 52 from the gusset material 20.

In this way, the inverting and holding mechanism 102 uses the cylindrical gusset material 20, which has been divided into two parts, two times for one piece of gusset material 20.

In the process of feeding the gusset material 20 to the clamp mechanism by the inverting and holding mechanism 102, if some positional shift is present between the welt end portion of the hose material 11 bitten by the clamp mechanism and the welt end portion of the gusset material 20 inserted in the gusset material insertion plate 52, there would be a step gap between the two welt portions in the sewing of panty hose as shown in FIGS. 21(C), (D), resulting in occurrence of defective products.

Accordingly, as shown in FIG. 21, there are provided first detecting means 103 for detecting one welt end portion of the cut edges of the hose material 11 bitten by the clamp mechanism stopped in the gusset material inserting position P$_4$, and second detecting means 104 for detecting the welt end portion of the gusset material 20 inserted in the gusset material insertion plate 52 that is held horizontal by the inverting and holding mechanism 102. Based on the conditions detected by the two detecting means 103, 104, the gusset material insertion plate 52 is moved lengthwise by the inverting and holding mechanism 102 so that the welt end portion of the hose material 11 and the welt end portion of the gusset material 20 are aligned with each other in line.

Figure 22A:
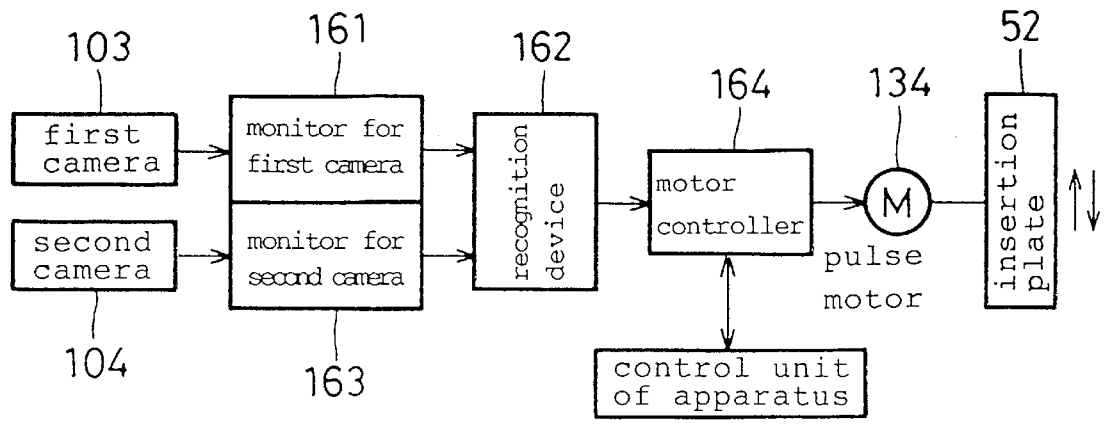
FIG. 22(A) is a block diagram of a means for performing the position detection and position alignment of welt end portions.

As to the detecting means 103, 104, which use image pickup means (camera), the first detecting means 103 picks up an image of around the welt end portion of the hose material 11 bitten by the clamp mechanism and, as shown in FIG. 22(A), displays it onto a monitor 161, extracts a necessary area from the displayed image, detects the position of the welt end portion in the extracted area and outputs the detected position to a recognition device 162.

The second detecting means 104 picks up an image of around the welt end portion of the gusset material 20 inserted in the gusset material insertion plate 52 held by the inverting and holding mechanism 102 that is located in the retreat position, displays the image onto a monitor 163, extracts a necessary area from the displayed image, detects the position of the welt end portion in the extracted area and outputs the detected position to the recognition device 162.

In this process, the position detection of the welt end portion is achieved in the following manner.

Figure 22B:
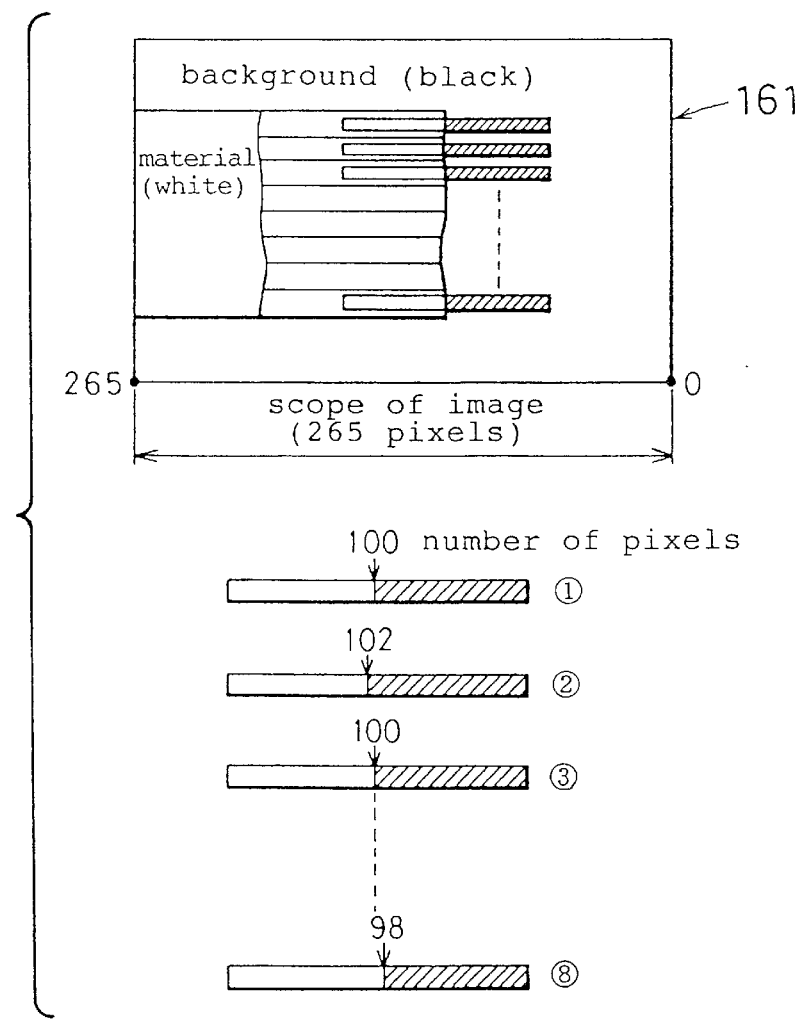
FIG. 22(B) is an explanatory view of the detection by an image displayed on the monitor of the same means.
Figure 25A:
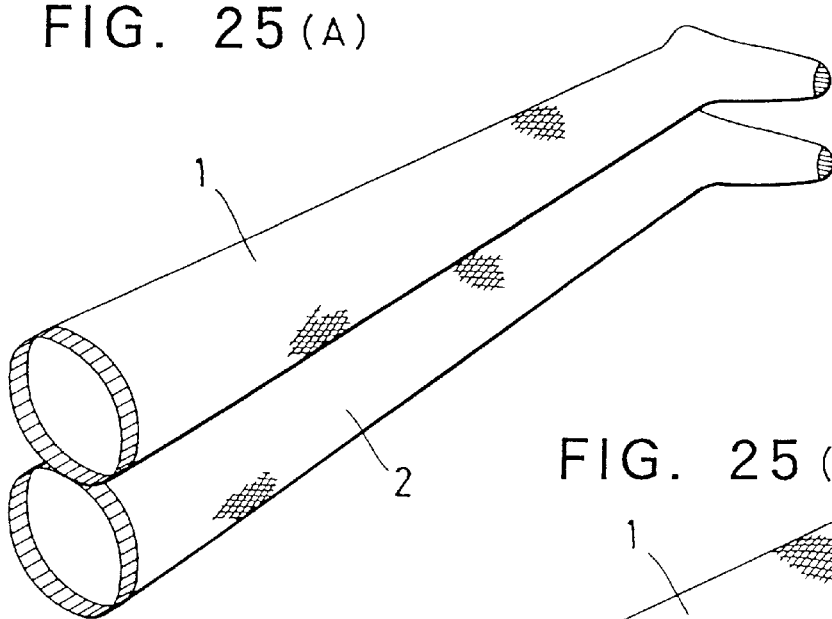
FIGS. 25(A) to (C) are perspective views showing a first half of the sewing process of a pair of panty hose with a diamond-like gusset.
Figure 25B:
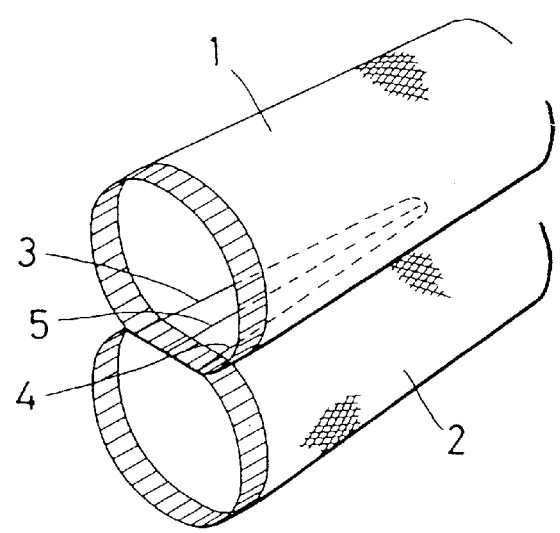
Figure 25C:
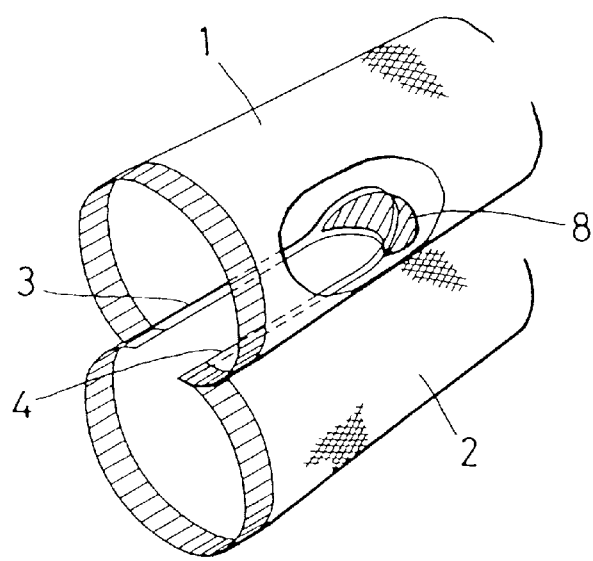
Figure 26A:
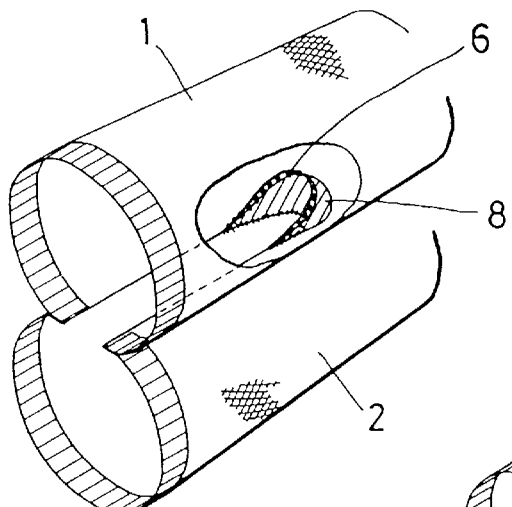
FIGS. 26(A) to (C) are perspective views showing a second half of the sewing process of the same.
Figure 26B:
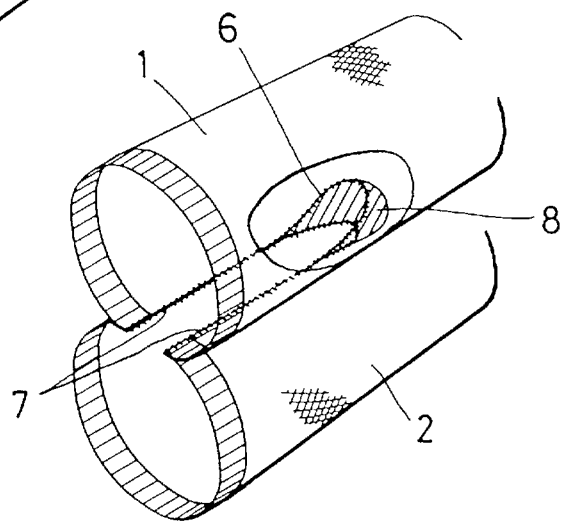
Figure 26C:
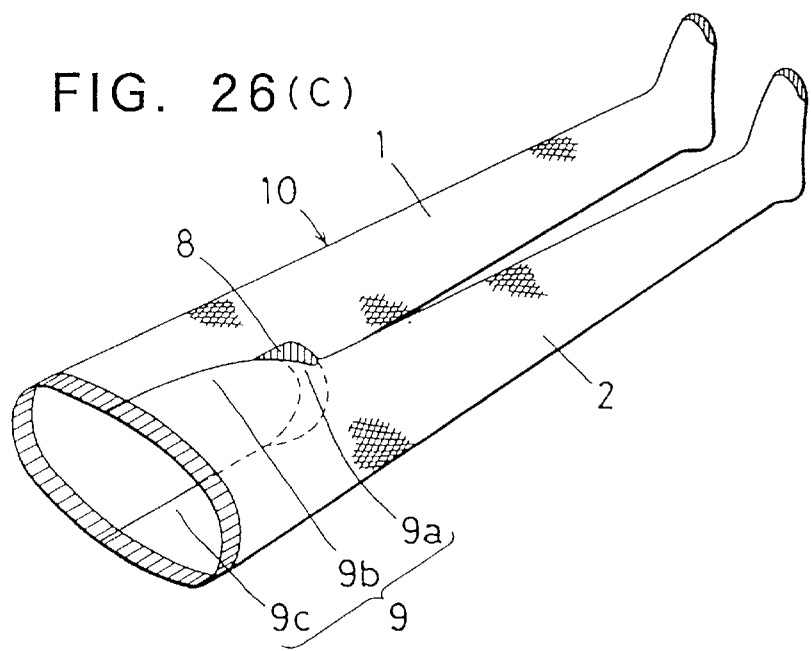

As shown in FIG. 22(B), in the monitor 161, material part including the welt portion is shown white and the background is shown black.

Coordinates of a border line (which forms the welt end portion) between white (material) and black (background) within extracted areas (eight in number in the illustrated example) are detected, i.e., it is determined whether or not a border line is present at a position of any pixel out of 265 pixels of the monitor 161.

If eight areas are involved as in the illustrated example, a mean value of them is determined.

In the case of FIG. 22(B), if the welt end portion of the hose material 11 is detected, the mean value of the number pixels that are the positions of the welt end (border line) displayed on the monitor are 100, so that the welt end portion shown on the monitor is determined to be present at the position of the 100th pixel of the monitor.

Meanwhile, the welt end portion of the gusset material is also detected in the same way. If the detected position is at the 80th pixel of the monitor, the resulting two numerals are outputted to the recognition device 162.

Then, a deviation α (see FIG. 21) between the two detected positions is calculated in the recognition device 162 (100–80=20). The calculated deviation a corresponding to 20 pixels is outputted from the recognition device 162 to a motor controller 164, and the motor controller 164 transmits generates pulses corresponding to the calculated deviation a in response to the output, thereby driving a pulse motor 134 of the inverting and holding mechanism 102. Thus, the gusset material insertion plate 52 is moved rightward in the case of FIG. 21 so that the position of the insertion plate 52 is corrected lengthwise.

Through these operations, the welt end portion of the hose material 11 and the welt end portion of the gusset material 20 are positioned so as to be aligned in line with each other.

It is noted that the size of one pixel of the monitor is 0.08 mm and so a quantity of 20 pixels causes the gusset material insertion plate 52 to be moved rightward in FIG. 21 by 1.6 mm.

The sewing apparatus of the present invention is constructed as described above. Next the sewing method is explained.

First, in the material loading position P$_1$ in FIG. 3, a pair of cylindrical hose material are inserted into between the left and right clamp groups 30, 40 by an operator. That is, one piece of hose material 11 is inserted so as to stretch over the paralleled upper clamps 32 and 42, and the other piece of hose material 11 inserted into between the lower clamps 33 and 43 (the state of FIG. 13 and FIG. 15(A)).

The upper and lower clamps 32, 33 and 42, 43 are separated open, where the upper and lower middle clamps 34, 35 and 44, 45 are repelling with the upper and lower clamps 32, 33 and 42, 43.

Figure 15A:
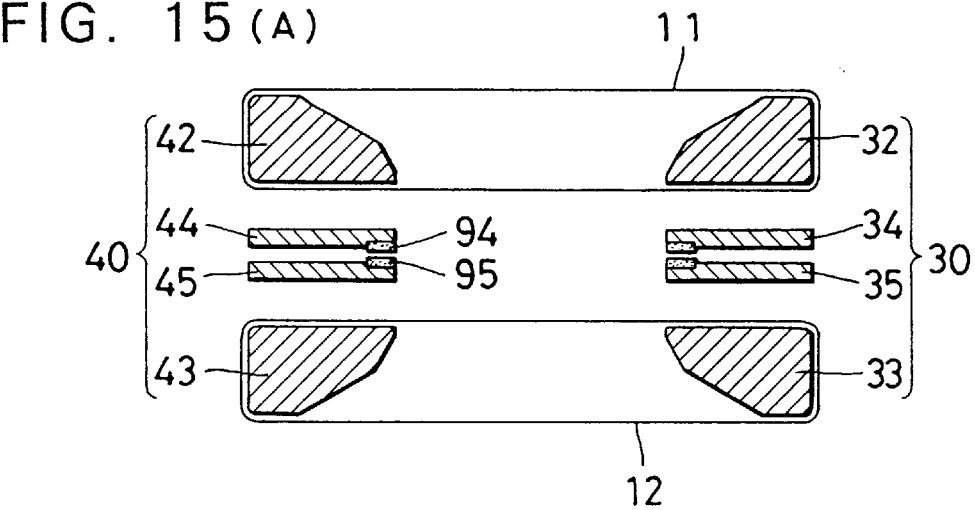
FIG. 15(A) is a sectional view showing a state during the opening process of the clamp group.
Figure 15B:
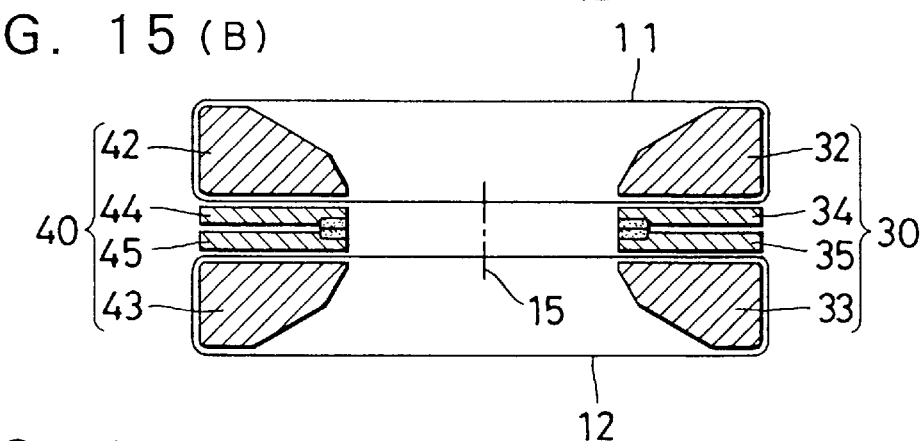
FIG. 15(B) is a sectional view in which the hose material is bitten.

After that, while the clamp mechanism moves from the position $P_1$ to the position $P_2$, an electromagnet (not shown) is activated so that the upper and lower clamps 32, 42, 33, 43 are brought into press contact with the middle clamps 34, 35, 44, 45, respectively. Then the materials for the inner thigh portions of the hose materials 11, 12, which form the panty part, are overlappedly sandwiched therebetween, as shown in FIG. 15(B).

Then, with the upper and lower clamps 32, 33, 42, 43 in the press contact, the levers 65, 66 of the magnet mechanism are pivoted so that the upper clamps 32, 42 and the lower clamps 33, 43 are attracted to the upper middle clamps 34, 44 and the lower middle clamps 35, 45, respectively.

As a result, one hose material 11 is bitten by the upper clamps 32, 42 and the upper middle clamps 34, 44, while the other hose material 12 are bitten by the lower clamps 33, 43 and the lower middle clamps 35, 45.

Meanwhile, as shown in FIG. 3, in the material loading position $P_1$, gusset material 20 previously formed into a cylindrical shape is inserted into the gusset material insertion plate 52 pinched by the gripping mechanism 53 and the insertion plate 52 is conveyed by the conveyor mechanism 54 to the gusset material feed mechanism 51 that is standing by in the gusset material inserting position $P_4$.

Figure 14:
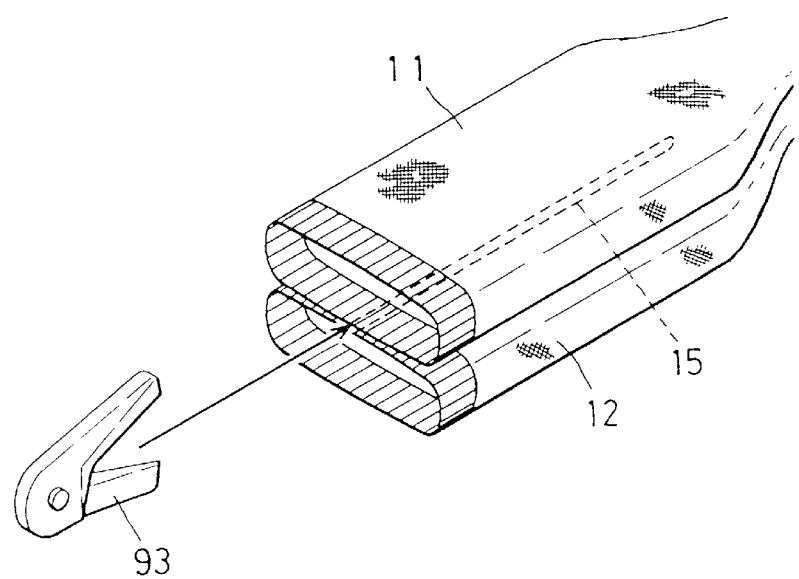
FIG. 14 is a perspective view showing the cutting process of the hose material.

Next, when the left and right clamp groups 30, 40 have moved to the cut position $P_2$, a cutter 93 shown in FIG. 14 advances to central opening portions of the cylindrical materials 11, 12, cutting a broken line portion 15 of the bitten materials.

This scissor-like cutter 93 is so arranged as to be reciprocatingly moved back and forth by an appropriate driving device. After the cutting of these materials 11, 12, the clamp groups 30, 40 transfers from the cut position $P_2$ to the material expanding position $P_3$ while keeping biting the materials 11, 12.

Figure 8:
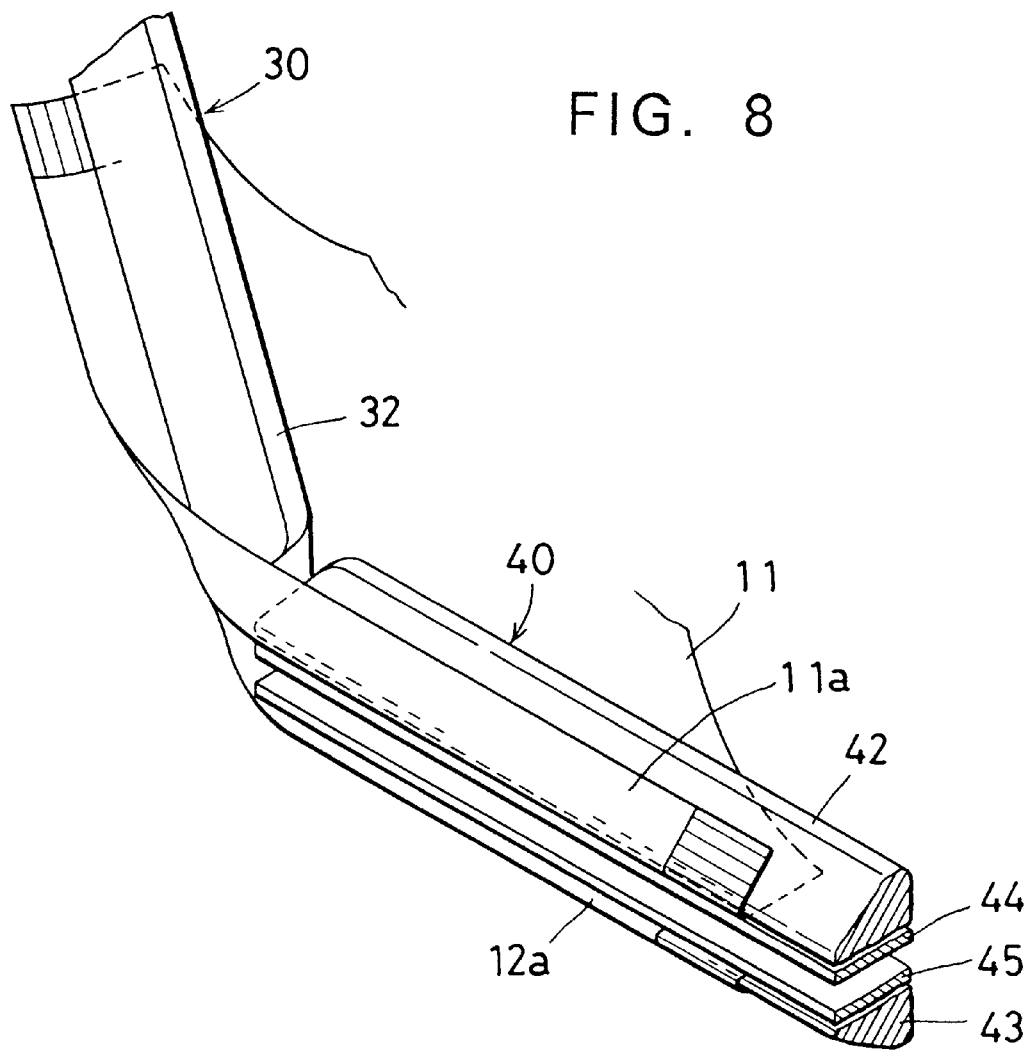
FIG. 8 is a perspective view showing a bitten state of hose material and gusset material in the clamp mechanism.

At this point, the arms 31, 41 of the clamp groups 30, 40 are expanded open to an angle of 180° or more (a gusset material insertion angle beyond the circumferential orbit line), resulting in the state of FIG. 8 where the cut edges 11a, 12a of the materials 11, 12 are exposed to outside.

Accordingly, the left and right clamp groups 30, 40 are formed into a generally triangular shape showing a mountain-like summit at their free ends.

In the material expanding position $P_3$, the cut edges 11a, 12a of the materials 11, 12 are separated from each other above and below by some appropriate means such as suction or jet of air, as shown in FIG. 8, moving to the gusset material inserting position $P_4$ while keeping in the separated state.

Figure 15C:
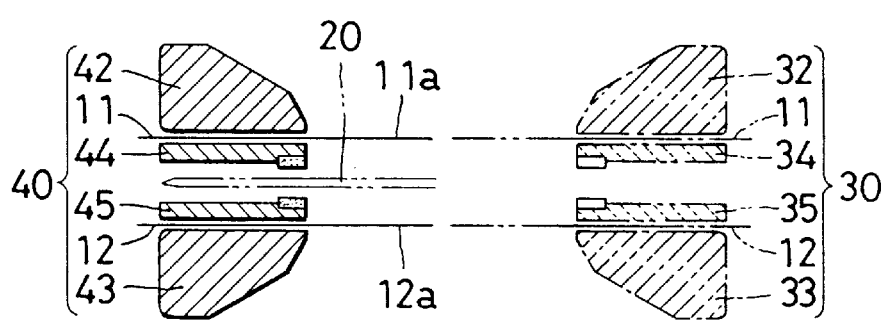
FIG. 15(C) is a longitudinal sectional view of the insertion of the gusset material.

In the state of FIG. 8, as the clamp mechanism reaches the gusset material inserting position $P_4$, the upper and lower clamps 32, 42 and 34, 43 that have been in the press contact state are temporarily separated away (the state of FIG. 15(C)), forming spaces between the upper and lower middle clamps 34, 35, 44, 45, thus ready for the insertion of the gusset material 20.

In addition, as to the hose materials 11, 12 in this process, the hose material 11 is bitten between the upper clamps 32, 42 and the upper middle clamps 34, 44, and the material 12 is bitten between the lower clamps 33, 44 and the lower middle clamps 35, 45, respectively, by attractive effect of the magnet mechanism.

Figure 15D:
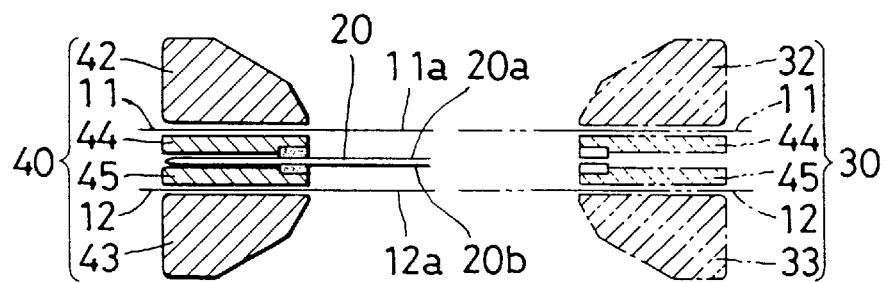
FIG. 15(D) is a sectional view in which the gusset material is bitten.

Then, as will be described later, when the gusset material 20 is inserted into between the upper and lower middle clamps 44, 45 in a folded-in-two state, the upper and lower clamps 44, 45 bite the gusset material 20 press-contacted again and inserted as shown in FIG. 15(D) therebetween.

The gusset material insertion plate 52, into which the gusset material 20 has been inserted at the material loading position $P_1$, is delivered by the gusset material conveyor mechanism 54 to the welt-end-portion positioning mechanism 101 that is standing by in the retreat position. The welt-end-portion positioning mechanism 101 firmly grips both end portions of the gusset material insertion plate 52 by the receiving claw 110 and the gripping claw 111, and performs the positioning of the upper and lower welt end portions by the action of the upper and lower grips 123, 127 and the sensors 124, 128.

After this positioning, the upper and lower arms 118, 120 are separated open, while the movable base 109 advances to insert the gusset material insertion plate 52 into between the up-and-down separated inverting and holding devices 157, 158 of the inverting and holding mechanism 102 that is standing by in the retreat position. At the insertion position where the longitudinal center line of the gusset material insertion plate 52 and the centers of rotation of the inverting and holding devices 157, 158 are coincident with each other, the inverting and holding devices 157, 158 are closed, pinching a position of the gusset material insertion plate 52 closer to the rear than to the center. After this, the gripping claws 111 are separated open, causing the gusset material insertion plate 52 to be released from being held, where the welt-end-portion positioning mechanism 101 returns to the retreat position.

When the gusset material insertion plate 52 is fed to the inverting and holding mechanism 102, the welt end portion of the hose material 11 bitten by the clamp mechanism that is stopped in the gusset material inserting position $P_4$ is detected by the first detecting means 103, while the welt end portion of the gusset material 20 held by the inverting and holding mechanism 102 and inserted into the gusset material insertion plate 52 is detected by the second detecting means 104. Then the pulse motor 134 is driven to an extent of a deviation based on this detection, by which the gusset material insertion plate 52 held by the inverting and holding mechanism 102 is moved lengthwise so that the welt end portions of the hose material 11 and the gusset material 20 are aligned in line with each other.

After the positioning of the welt portions, the inverting and holding mechanism 102 advances toward the clamp mechanism that is located at the gusset material inserting position $P_4$, by which the gusset material insertion plate 52 enters into between the upper and lower middle clamps 44, 45, so that the gusset material 20 placed in the fore of the gusset material insertion plate 52 is bitten by the upper and lower middle clamps 44, 45. Thereafter, the scissor mechanism 140 makes an upward movement and a movement along the length of the slit 73, cutting the gusset material 20 into two along the slit 73. After these steps, the inverting and holding mechanism 102 retreats, causing the gusset material insertion plate 52 to escape from the clamp mechanism. Thus, the delivery of the gusset material 20 is completed.

When the inverting and holding mechanism 102 has returned to the retreat position, the inverting and holding devices 157, 158 are inverted upside down. Then, the remaining divisional gusset material 20 is directed forward in the direction of its move, thus awaiting for the next insertion of gusset material for the clamp mechanism.

The gusset material 20 inserted into between the upper and lower middle clamps 44, 45 in a folded-in-two state as shown above is pressed and held from above and below by sponges or rubbers 94, 95 as shown in FIG. 15(D), so that the cut edges 11a, 12a of the upper and lower hose materials coincide with cut edges 20a, 20b of the gusset material 20 inserted in a two-folded state.

In this state, the left and right clamp groups 30, 40 move from the gusset material inserting position $P_4$ and the angle changing position $P_5$, where their opening angle changes from a gusset material insertion angle shown in FIG. 16(A) to a sewing angle of 180° or less shown in FIG. 16(B). As a result, an upper edge portion 20' and a lower edge portion 20" of terminal end portion of the gusset material bitten by the clamp mechanism are arranged so as to form a triangular shape and to be protruded from the material cut edges 11a, 12a outward, and in this state, move next to the first sewing position $P_6$.

At this point, the upper cut edge 11a of the panty hose and the upper edge portion 20a of the gusset material part 20, which are aligned with the circumferential orbit line as shown in FIGS. 23(A), (B), pass through the first sewing machine 22 (see FIG. 3), by which an upper seam 96 is formed.

Then, in this formation of the upper seam 96, excess material part (shaded part in FIG. 23(A)) of the upper edge portion 20' protruding from the cut edge 11a is cut away by the cutter of the sewing machine 22. Also, in the sewing process by the first sewing machine 22, the lower cut edge 12a of the panty hose and the lower edge portion 20b of the gusset material 20 are folded back downward by a guide plate 97 as shown in FIG. 23(B).

After that, by passage through the second sewing machine 23 (see FIG. 3) on the way of move to the second sewing position $P_7$, the lower cut edge 12a of the panty hose and the lower edge portion 20b of the gusset material 20 have a seam 98 formed as shown in FIGS. 24(A), (B).

In this process, as in the foregoing case, excess material part (shaded part in FIG. 24(A)) of the lower edge portion 20" protruding from the cut edge 12a is cut away by the cutter of the sewing machine 23.

Then, in the sewing process by the second sewing machine 23, the upper seam 96 of the panty hose is folded back upward by another guide plate 99 as shown in FIG. 24(B).

In this way, the seam 96 shown in FIG. 23(C) and the seam 98 shown in FIG. 24(C) can automatically be sewn by the action of the guide plates 97, 99.

Figure 4:
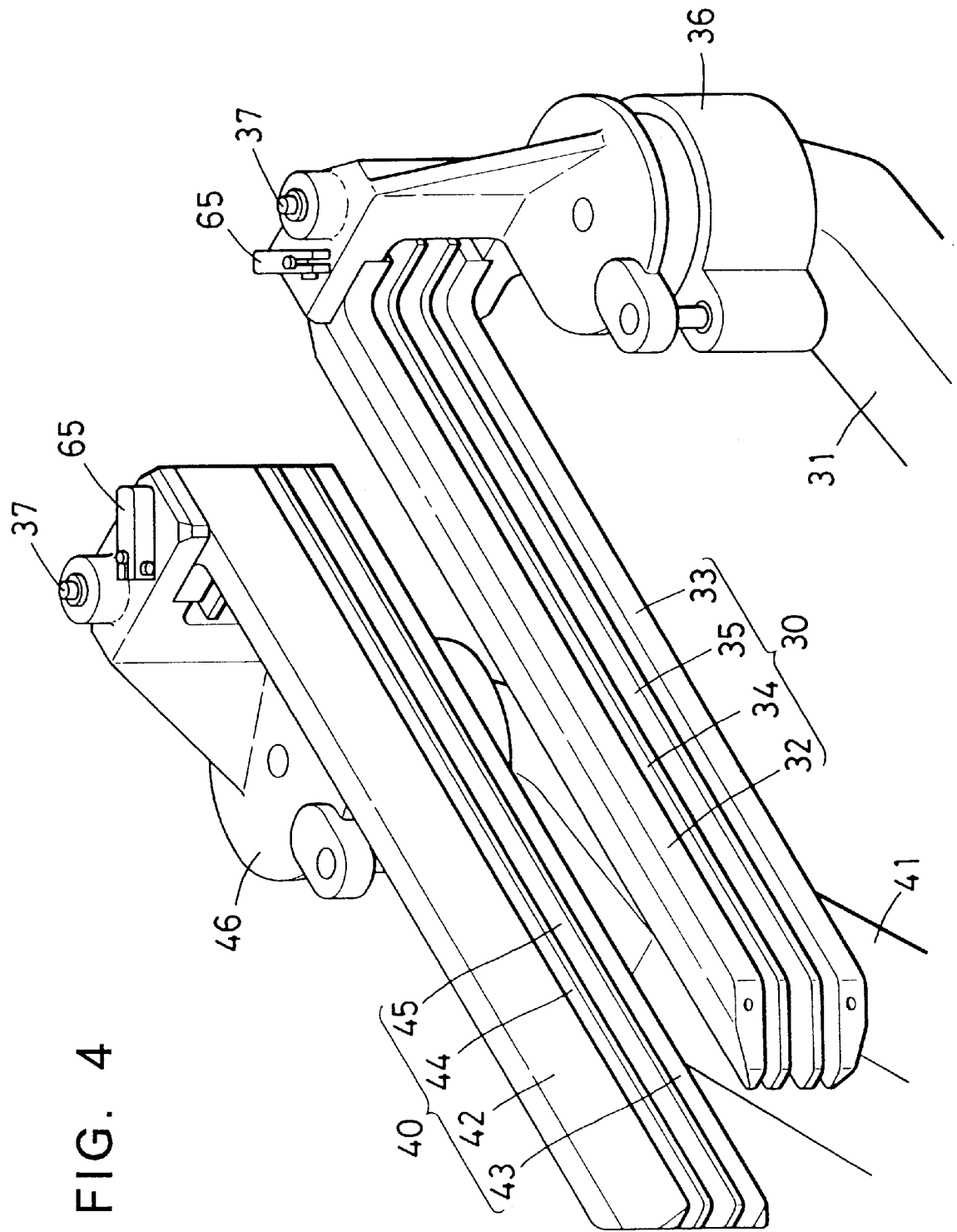
FIG. 4 is a perspective view of the clamp mechanism showing an arrangement with middle clamps interposed between the left and right clamp groups.

With the two-step sewing process by the two sewing machines 22, 23 shown in FIG. 3 completed, the left and right clamp groups 30, 40, when returning to the material loading position $P_1$, are closed from the state of alignment with the circumferential orbit line into the paralleled state of the original position by the pivoting of the arms 31, 41 (FIG. 4).

After that, the electromagnet is de-energized so that the biting of the materials 11, 12 that has continued up to this point is released, the sewing materials being pulled out. Afterwards, hose material is loaded once again to the clamp groups 30, 40 and the above-described sequence of operations are iterated.

As described above, while the operator is only required to perform the work of loading the hose materials 11, 12 to the left and right clamp groups 30, 40 at a location in front of the material loading position $P_1$ of FIG. 3, and work of inserting the backpanel-like gusset material 20 into the gusset material insertion plate 52, the panty hose with a backpanel-like gusset can otherwise fully automatically be sewn with seams aligned, efficiently.

Still, since the processes with the gusset insertion are accomplished in succession while moving the left and right clamp groups 30, 40 having the same function, the sewing process is completed with incomparably much higher efficiency than that of the conventional process by the operator. Thus, the invention process can lead to a remarkable reduction in price and contribute to a rationalization of production.

If the gusset material insertion plate 52 formed into a tapered shape as shown in FIG. 9(C) is used for the insertion of the gusset material 20 from the inverting and holding mechanism 102 toward the clamp mechanism of the gusset material inserting position $P_4$, the gusset material 20 becomes narrower in width on the welt portion side. Then, if the sewing process is executed by inserting this gusset material 20 into the clamp mechanism, the gusset material 20 is sewn into such a kite shape that the welt portion is smaller in width and increasingly larger in width toward the hip portion, as shown in FIGS. 17(A), (B), (C).

Also, when the gusset material insertion plate 52 of a straight shape as shown in FIG. 9(B) is used, a gusset material 20 of the same width can be sewn over a range from the welt portion to the hip portion as shown in FIGS. 16(A), (B), (C). On the other hand, when the gusset material insertion plate 52 is inserted in a tilted placement into the clamp mechanism and moreover less inserted into the clamp mechanism on its welt portion side as shown in FIGS. 18(A), (B), (C), the gusset material 20 can be sewn in a kite shape as in the case of the gusset material insertion plate 52 formed into a tapered shape.

For the sewing of the gusset material 20 into a kite shape, it is also possible to adopt a combination of a tapered gusset material insertion plate and its tilted placement, other than the use of a tapered gusset material insertion plate 52 and the tilted placement of a straight shaped gusset material insertion plate 52. This allows a kite-shaped gusset of any size and any configuration to be obtained as shown in FIG. 18(D).

Although the above description has been made with only a circumferential orbit, elliptical orbits and those of other configurations can easily be conceived from the present invention.

As described hereinabove, since the backpanel-like gusset is inserted over a range from rear portion to the inner thigh portion of the panty part, the gusset becomes a wider in rear portion, with margins produced, so that better wearing fitnesses at the hip portion and the inner thigh portion can be obtained.

Moreover, the automatization of the gusset insertion process leads to a considerable improvement in the working efficiency.

Further, by the sewing process including the positioning of the gusset material and the hose material, the resulting product free from any positional shift in the welt portion can be obtained and moreover pairs of panty hose having a gusset material that is smaller in width in the welt portion and that gets increasingly larger in width toward the hip portion can be produced.

That which is claimed:

1. A method of fabricating panty hose from a pair of circular knit hosiery blanks, and a panel of knit fabric inserted in the panty portion of the panty hose comprising a) positioning welt end portions of a pair of hosiery blanks on respective upper and lower pairs of spaced apart clamping members with the welt end portions in position to be formed into the panty portion of the panty hose, b) providing upper and lower pairs of spaced apart, middle clamping members between the upper and lower pairs of clamping members, c) clamping the welt end portions of the pair of hosiery blanks respectively between the upper pair of clamping members and the upper pair of middle clamping members and between the lower pair of clamping members and the lower pair of middle clamping members, d) cutting the welt end portions of the hosiery blanks from the welts longitudinally for a predetermined distance medially between the clamping members such that the respective cut edges project outwardly from the clamping members, e) folding the panel of knit fabric longitudinally to position side edges thereof in substantial juxtaposition, f) inserting the folded panel between the upper and lower pairs of middle clamping members with side edges thereof in substantial juxtaposition with the cut edges of the welt end portion of each of the pair of hosiery blanks and with the panel extending from the welt end thereof to and through the crotch of the panty portion being formed, and g) sewing one of the side edges of the panel to the cut edges of the welt end portions of one of the hosiery blanks and the other side edge of the panel to the cut edges of the welt end portion of the other hosiery blank and the remainder of the cut edges of the welt end portions together to complete the formation of the panty portion of the panty hose while positioning the panel relative to the hosiery blanks so that the width of the panel sewn into the panty portion is narrower at the welt end than in the medial portion thereof, whereby the panty portion has more girth in the hip area than in the waist area.

2. A method of fabricating panty hose according to claim 1 wherein the panel is sewn into the panty portion in the back of the panty hose.

3. A method according to claim 2 wherein the panel initially has straight, parallel side edges and the panel is inserted so that the side edges thereof are not parallel to the cut edges of the welt end portions but are disposed at an acute angle thereto.

4. A method according to claim 2 wherein the panel is tapered from the welt end toward the crotch end with the welt end being narrower than the medial portion thereof.

5. A method according to claim 2 wherein a panel insertion plate is used to insert the folded panel between the upper and lower middle clamping members and the panel insertion plate is tilted to position the panel for sewing to the cut welt end portions of the hosiery blanks.

6. A method of fabricating panty hose, having a panty portion and a pair of leg portions, from a pair of circular knit hosiery blanks having a welt end and a toe end and from a panel of knit fabric inserted in the panty portion of the panty hose, said method comprising:

a) positioning welt end portions of a pair of hosiery blanks on respective upper and lower pairs of spaced apart clamping members with the welt end portions in position to be formed into the panty portion of the panty hose, b) providing upper and lower pairs of spaced apart, middle clamping members between the upper and lower pairs of clamping members, c) clamping the welt end portions of the pair of hosiery blanks respectively between the upper pair of clamping members and the upper pair of middle clamping members and between the lower pair of clamping members and the lower pair of middle clamping members, d) cutting the welt end portions of the hosiery blanks from the welts longitudinally for a predetermined distance medially between the clamping members such that the respective cut edges project outwardly from the clamping members, e) partially inserting a folded panel of knit fabric having a welt end and a crotch end between the pairs of upper and lower middle clamping members, f) detecting the position of the welt end of one of the cut welt end portions of the hosiery blanks and the position of the welt end of the folded panel, g) aligning the welt end of the folded panel with the welt end of the hosiery blank while completing the insertion of the folded panel between the pairs of middle clamping members to position the side edges of the folded panel relative to the cut edges of the welt end portions of the hosiery blanks for attachment thereto, and h) sewing the side edges of the folded panel to the cut edges of the welt end portions of the hosiery blanks from the welt ends to and through the crotch of the panty portion and sewing the remainder of the cut edges of the welt end portions together to complete the panty portion.

7. A method according to claim 6 wherein the side edges of the said panel are sewn to the cut edges of the welt end portions so that said panel is narrower at the welt end thereof than in the medial portion thereof.

8. A method according to claim 7 wherein a panel insertion plate is used to insert the folded panel between the upper and lower middle clamping members and the panel insertion plate is tilted to position the side edges of the panel for sewing to the cut edges of the welt end portions.

9. A method according to claim 6 wherein the panel is formed from circular knit fabric which is cut into two folded panels prior to the insertion of the panel.

10. Apparatus for fabricating panty hose from a pair of circular knit hosiery blanks, having welt ends and toe ends, and from a panel of knit fabric, said apparatus comprising:

a) spaced apart upper and lower pairs of spaced apart clamping members, each of said pairs of clamping members being adapted to receive a welt end portion of a hosiery blank thereon, b) spaced apart upper and lower pairs of spaced apart middle clamping members mounted between said upper pair of clamping members and said lower pair of clamping members and in alignment therewith, at least one pair of clamping members of said upper pair of clamping members and said upper pair of middle clamping members and at least one pair of said lower pair of clamping members and said lower pair of lower middle clamping members being movable toward and away from the other of said pairs to clamp the welt end portions along spaced apart areas longitudinally thereof from the welt ends thereof for a predetermined distance, c) cutting means for cutting the clamped welt end portions of the hosiery blanks medially of said spaced apart clamping member from the welt ends thereof longitudinally for a predetermined distance substantially equal to the distance from the waist to the crotch of the panty portion of the panty hose to form cut edges in the clamped welt end portions that are aligned for attachment by sewing, d) means for inserting a folded panel of knit fabric, having a welt end and a crotch end, between said upper and lower pairs of middle clamping members and for aligning the welt end of the panel with the welt end of at least one of the hosiery blanks to position the panel with side edges thereof for attachment by sewing the cut edges of the welt end portions of the hosiery blanks, and e) means for sewing side edges of the panel to cut edges of the welt end portions of the pair of hosiery blanks from the welt end to and through the crotch and for sewing the remainder of the cut edges of the welt end portions of the hosiery blanks together to complete the formation of the panty portion of the panty hose.

11. Apparatus according to claim 10 wherein said clamping members are mounted for movement between a first position in which the clamping members of each pair are substantially parallel and a second position in which the clamping members of each pair are generally aligned to present the cut edges of the hosiery blanks to said sewing means.

12. Apparatus according to claim 11 wherein said panel insertion means includes first detecting means for detecting one welt end of one of the hosiery blanks and second detecting means for detecting the welt end of the panel so that said panel insertion means aligns these welt ends.

13. Apparatus according to claim 10 wherein said panel insertion means includes a panel insertion plate for receiving thereon the folded panel and insertion plate feeding means for feeding said panel insertion plate and the folded panel thereon into position between said pairs of middle clamping members.

14. Apparatus according to claim 13 wherein said panel insertion means further includes positioning means for aligning the welt end of the panel on said panel insertion plate with the welt end of at least one of the hosiery blanks.

15. Apparatus according to claim 14 wherein the panel is formed from a circular knit fabric and said panel insertion means includes cutting means for forming two folded panels from a length of circular knit fabric and for holding one panel while inserting the other into position for sewing into the panty portion of a panty hose.

16. Apparatus according to claim 10 wherein said panel insertion means positions the panel such that when sewn into the panty portion, the panel is narrower at the welt end than at the medial portion thereof.

* * * * *